(12) United States Patent
Watanuki

(10) Patent No.: US 7,839,543 B2
(45) Date of Patent: Nov. 23, 2010

(54) DOCUMENT IMAGER, DOCUMENT STILLNESS DETECTION METHOD, AND COMPUTER PROGRAM PRODUCT

(75) Inventor: Masatoshi Watanuki, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 964 days.

(21) Appl. No.: 11/701,391

(22) Filed: Feb. 1, 2007

(65) Prior Publication Data

US 2007/0188830 A1   Aug. 16, 2007

(30) Foreign Application Priority Data

Feb. 3, 2006   (JP)   ............... 2006-027225

(51) Int. Cl.
*H04N 1/04*    (2006.01)
*B65H 5/22*    (2006.01)
(52) U.S. Cl. ............... 358/474; 271/3.14; 271/3.01
(58) Field of Classification Search ............... 358/505, 358/400, 403, 474, 482, 483, 486, 493, 494, 358/496, 497, 498; 271/3.14, 3.01, 3.08, 271/3.09; 382/312
See application file for complete search history.

(56) References Cited

U.S. PATENT DOCUMENTS

2003/0058364 A1*  3/2003  Kuo et al. ............... 348/375

2007/0211309 A1*  9/2007  Kuo et al. ............... 358/474

FOREIGN PATENT DOCUMENTS

| JP | 2000-004390 A | 1/2000 |
| JP | 2000-308045 A | 11/2000 |
| JP | 2003-204452 A | 7/2003 |
| JP | 2003-319254 A | 11/2003 |
| JP | 2005-123752 A | 5/2005 |

OTHER PUBLICATIONS

Japanese Office Action dated Jun. 2, 2009 and English translation thereof issued in a counterpart Japanese Application No. 2006-027225.

* cited by examiner

*Primary Examiner*—Jerome Grant, II
(74) *Attorney, Agent, or Firm*—Holtz, Holtz, Goodman & Chick, PC

(57) ABSTRACT

A computer program product executed by a computer connected with a document imager that uses an imaging section to image an original document mounted on a document bed plate on which the original document is mounted and which has a specific pattern formed on a surface thereof and outputs an image of the original document allows a CPU to execute a judging step of judging stillness of the original document mounted on the document bed plate from at least one of a discontinuity of the pattern at an outer peripheral portion in a document bed plate image obtained by the imaging section and a change in the document bed plate image.

11 Claims, 17 Drawing Sheets

1a DOCUMENT BED PLATE

1a DOCUMENT BED PLATE

1a DOCUMENT BED PLATE

1a DOCUMENT BED PLATE

1a DOCUMENT BED PLATE

DOCUMENT IMAGER, DOCUMENT STILLNESS DETECTION METHOD, AND COMPUTER PROGRAM PRODUCT

CROSS-REFERENCE TO RELATED APPLICATIONS

This application is based upon and claims the benefit of priority from prior Japanese Patent Application No. 2006-027225, filed Feb. 3, 2006, the entire contents of which are incorporated herein by reference.

BACKGROUND OF THE INVENTION

1. Field of the Invention

The present invention relates to a document imager that is connected with a projector and captures an image of an original document mounted thereon to supply an image signal, a document stillness detection method, and a computer program product.

2. Description of the Related Art

There is conventionally a system having a structure in which a camera with a document bed plate called a document camera is connected with a personal computer and a projector device and an image of a document mounted on the document bed plate is captured as required to be projected and displayed as it is.

In this type of document camera, there has been conventionally considered a technology by which an image of a document mounted on the document bed plate is not simply output in a captured state, but an image of the document bed plate is not output until a document is placed at a correct position and stands still when placing the document on the document bed plate or an image immediately before any change in the document on the document bed plate is kept being output in order to prevent a complicated image from being projected at the time of presentation.

For example, Jpn. Pat. Appln. KOKAI Publication No. 2005-123752 (Patent Document 1) proposes a technology of detecting stillness of an original document on a document bed plate and determining that the original document is placed when an image has a fixed number or more of linear components (the number of edges included in the image).

Jpn. Pat. Appln. KOKAI Publication No. 2000-308045 (Patent Document 2) proposes a technology of separating an image of an original document from that of a hand since capturing images of both the original document and the hand in a close field is inconvenient although it is not a technology concerning the document camera itself.

The technology disclosed in Patent Document 1 cannot determine that an original document is placed since a linear part in an image becomes discontinuous on a stage where a user's hand covers an end of the original document and an amount of the linear part is reduced.

The technology disclosed in Patent Document 2 cannot be applied to a document camera having a structure in which an original document is mounted on a document bed plate.

BRIEF SUMMARY OF THE INVENTION

One aspect of the present invention comprises a document bed plate on which an original document is mounted and which has a specific pattern formed on a surface thereof; an imaging section that images the original document mounted on the document bed plate; a first stillness judging section that judges stillness of the original document mounted on the document bed plate from at least one of a discontinuity of the pattern at an outer peripheral portion of an image of the document bed plate and a change in the image at the outer peripheral portion obtained by the imaging section; and an output section that outputs the image of the document bed plate judged to be the stillness by the first stillness judging section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

A first embodiment in which the present invention is applied to a document projection system including a document camera device, a personal computer (PC), and a data projector device will now be described hereinafter with reference to the accompanying drawings.

Figure 1:
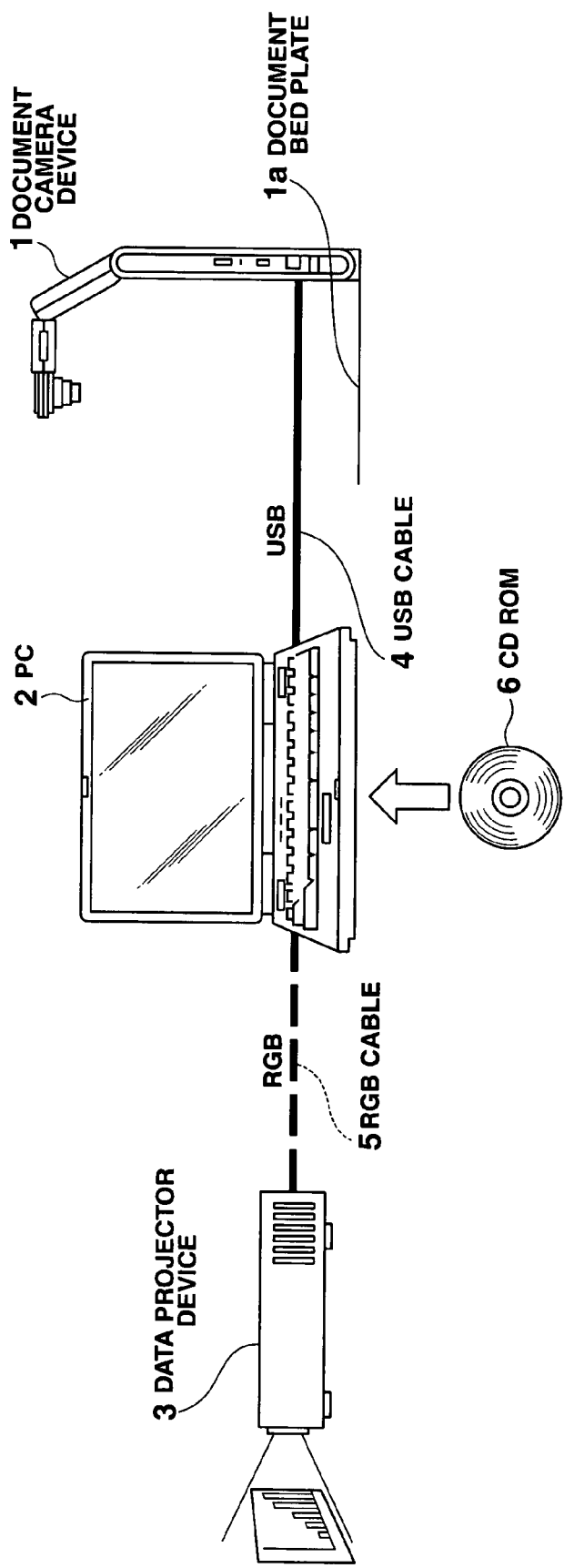
FIG. 1 is an appearance diagram showing an appearance and a connection structure of a document projection system according to a first embodiment of the present invention.

FIG. 1 shows an appearance and a connection structure of the entire system. A document camera device 1 is connected with a PC 2 through a USB (Universal Serial Bus) cable 4, the document camera device 1 constantly captures an image of a document mounted on a document bed plate 1a thereof, and the captured image is transmitted as an image signal having a digital value to the PC 2 through the USB cable 4 based on isochronous transfer in real time.

This PC 2 has a driver program for this document camera device 1 previously installed therein by using a recording medium, e.g., a CD-ROM 6 attached to the document camera device 1, executes the program to generate an image signal having an analog value corresponding to an image signal supplied from the document camera device 1, and transmits the generated image signal to a data projector device 3 via an RGB cable 5.

The data projector 3 forms an optical image corresponding to an image signal supplied by using, e.g., a micro-mirror element, and projects and displays various kinds of images on a screen as a projection target.

Figure 2:
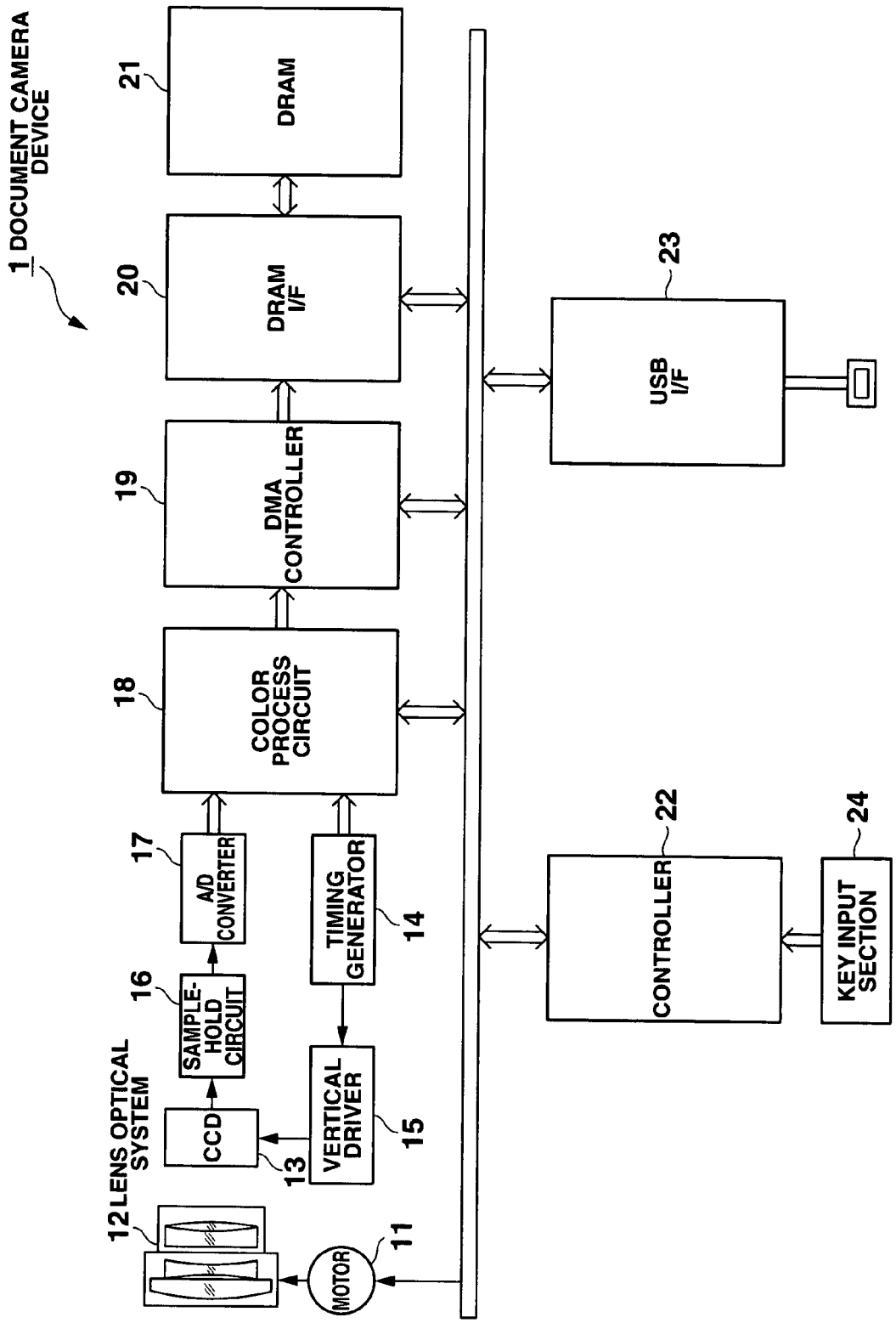
FIG. 2 is a block diagram showing a functional structure of an electronic circuit in a document camera device according to the first embodiment.

FIG. 2 shows a circuit configuration of the document camera device 1. As shown in this drawing, in a later-described display mode, a CCD 13 as an imaging element is arranged behind an imaging optical axis of a lens optical system 12 whose zoom viewing angle or aperture position is moved by driving from a motor (M) 11. This CCD 13 is driven for scanning by a timing generator (TG) 14 and a vertical driver 15, and outputs a photoelectrically converted output for one screen corresponding to a formed optical image in accordance with each fixed cycle.

This photoelectrically converted output is appropriately subjected to gain adjustment in accordance with each primary color component of RGB in a signal state having an analog value, then sampled and held by a sample-hold circuit (S/H) 16, and converted into digital data by an A/D converter 17.

This digital data is subjected to a color process including pixel interpolation processing and γ correction processing by a color process circuit 18 to generate a luminance signal Y and color difference signals Cb and Cr (YUV signals) having digital values, and the generated signals are output to a DMA (Direct Memory Access) controller 19.

The DMA controller 19 temporarily writes the luminance signal Y and the color difference signals Cb and Cr output from the color process circuit 18 in a buffer in the DMA controller 19 by using a composite synchronization signal, a memory write enable signal, and a clock signal likewise output from the color process circuit 18, and supplies the written signals to a DRAM 21 used as a buffer memory through a DRAM interface (I/F) 20 based on DMA transfer.

A controller 22 is constituted of a CPU, a non-volatile memory fixedly storing an operation program executed by the CPU, a work memory, and others, and controls the entire document camera device 1. After end of DMA transfer of the luminance and color difference signals to the DRAM 21, this controller 22 reads the luminance and color differenced signals (YUV signals) from the DRAM 21 via the DRAM interface 20 and transmits the read signals to a USB interface (I/F) 23.

The USB interface 23 transmits the luminance and color difference signals to the PC 2 through the USB cable 4 based on isochronous transfer in real time in accordance with a USB standard.

It is to be noted that, when an imaging instruction is received from the PC 2 through the USB interface 23 in a still display mode, the controller 22 cancels DMA transfer of the luminance and color difference signals for one screen fetched from the CCD 13 to the DRAM 21 at this point in time, newly drives the CCD 13 for scanning with an aperture value, a shutter speed, and a resolution based on adequate exposure conditions to obtain luminance and color difference signals for one screen, and transmits the obtained signals to the DRAM 21.

The luminance and color difference signals for one frame transferred to this DRAM 21 are supplied to the SUB interface 23 via the DRAM interface 20, and the USB interface 23 newly transmits these signals to the PC 2. After transmission of the image signals to the PC 2, the controller 22 returns to a through-display state to again activate a path from the CCD 13 to the DRAM 21.

It is to be noted that a key input section 24 is connected with the controller 22, and a key operation signal, e.g., a power supply key constituting this key input section 24 is directly input to the controller 22.

Figure 3:
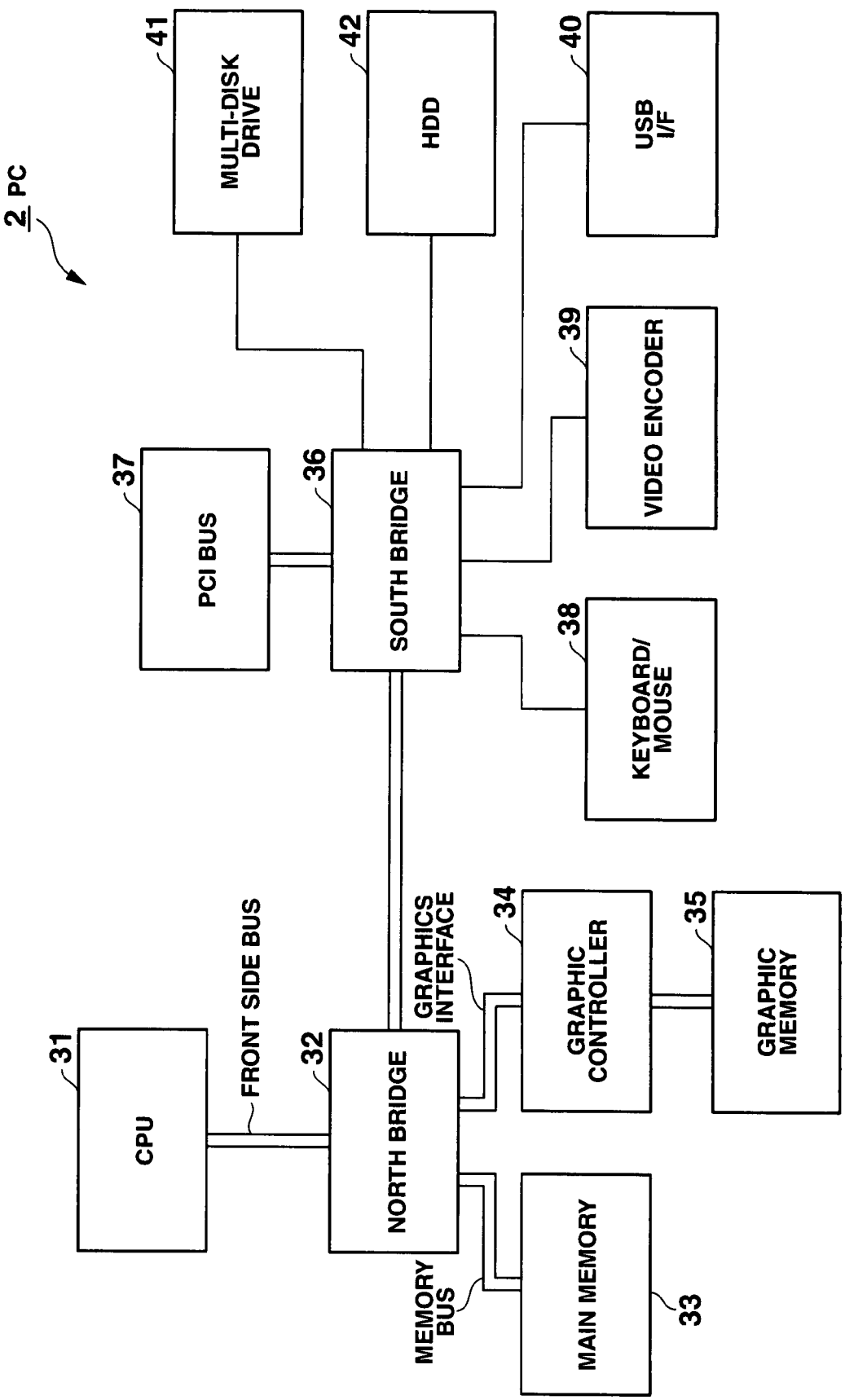
FIG. 3 is a block diagram showing a functional structure of an electronic circuit in a personal computer according to the first embodiment.

A structure of the PC 2 will now be described with reference to FIG. 3. FIG. 3 shows a hardware structure of this PC 2, and a CPU 31 that controls various kinds of processing is connected with a north bridge 32 via a front side bus FSB.

This north bridge 32 is connected with a main memory 33 via a memory bus MB, with a graphics controller 34 and a graphics memory 35 via a graphics interface AGP, and with a south bridge 36. The north bridge 32 mainly executes input/output control between these members.

The south bridge 36 is connected with a PCI bus 37, a keyboard/mouse 38, a video encoder 39, a USB interface 40, a multi-disk drive 41, and a hard disk drive (HDD) 42. The south bridge 36 mainly performs input/output control between these peripheral circuits and the north bridge 32.

It is to be noted that each element constituting the PC 2 corresponds to a very general technology, thereby omitting an explanation thereof.

It is to be noted that the video encoder 39 generates an RGB video signal as an image signal having an analog value from an image signal having a digital value supplied thereto, and outputs the generated signal.

The HDD 42 previously stores an OS (an operating system), various kinds of application programs, data files, and a driver program for the document camera device 1 installed by attaching the CD-ROM 6 to the multi-disk drive 41.

A circuit configuration of the data projector device 3 will now be described with reference to FIG. 4.

In the drawing, image signals based on various standards including an RGB video signal input from an input/output connector section 51 are integrated into an image signal having a predetermined format by an image converting section 53 through an input/output interface (I/F) 52 and a system bus SB, and then the integrated signal is supplied to a projection encoder 54.

The projection encoder 54 develops/stores the transmitted image signal in a video RAM 55, then generates a video signal from stored contents in this video RAM 55, and outputs the generated signal to a projection drive section 56.

This projection drive section 56 drives, e.g., a micro-mirror element 57 as a spatial optical modulation element (SOM) for display based on higher-speed time-sharing driving realized by multiplying an appropriate frame rate, e.g., 60 [frames/second], a division number of color components, and a display gradation number in accordance with a transmitted image signal.

When white light having a high luminance emitted from a light source lamp 59 arranged in a reflector 58 is appropriately colored into a primary color through a color wheel 60 and this micro-mirror element 57 is irradiated with this light through an integrator 61 and a mirror 62, an optical image is formed with reflected light from this element, and projected and displayed on a non-illustrated screen via a projection lens 63.

Therefore, lighting driving of the light source lamp 59 and a motor (M) 64 that drives the color wheel 60 to rotate are carried out based on a supplied voltage value from a projection light processing section 65.

A controller 66 controls all operations of the respective circuits. This controller 66 is constituted of a CPU, a non-volatile memory that stores programs for operations executed by the CPU including a later-described projecting operation or imaging operation processing, a work memory, and others.

A sound processing section 67 is also connected with this controller 66 via the system bus SB.

The sound processing section 67 includes a sound source circuit such as a PCM sound source, converts sound data supplied thereto in a projecting operation into analog data, drives a speaker 68 to amplify and output sound, or generates beep sound as required.

It is to be noted that each key operation signal in a key switch section 69 provided in this data projector device 3 is directly input the controller 66, and a signal from an Ir receiving section 70 is also directly input to the controller 66. This Ir receiving section 70 is provided on each of a front surface and a rear surface of the data projector device 3, and converts its infrared light reception signal into a code signal to be supplied to the controller 66.

An operation according to this embodiment will now be described.

Figure 5:
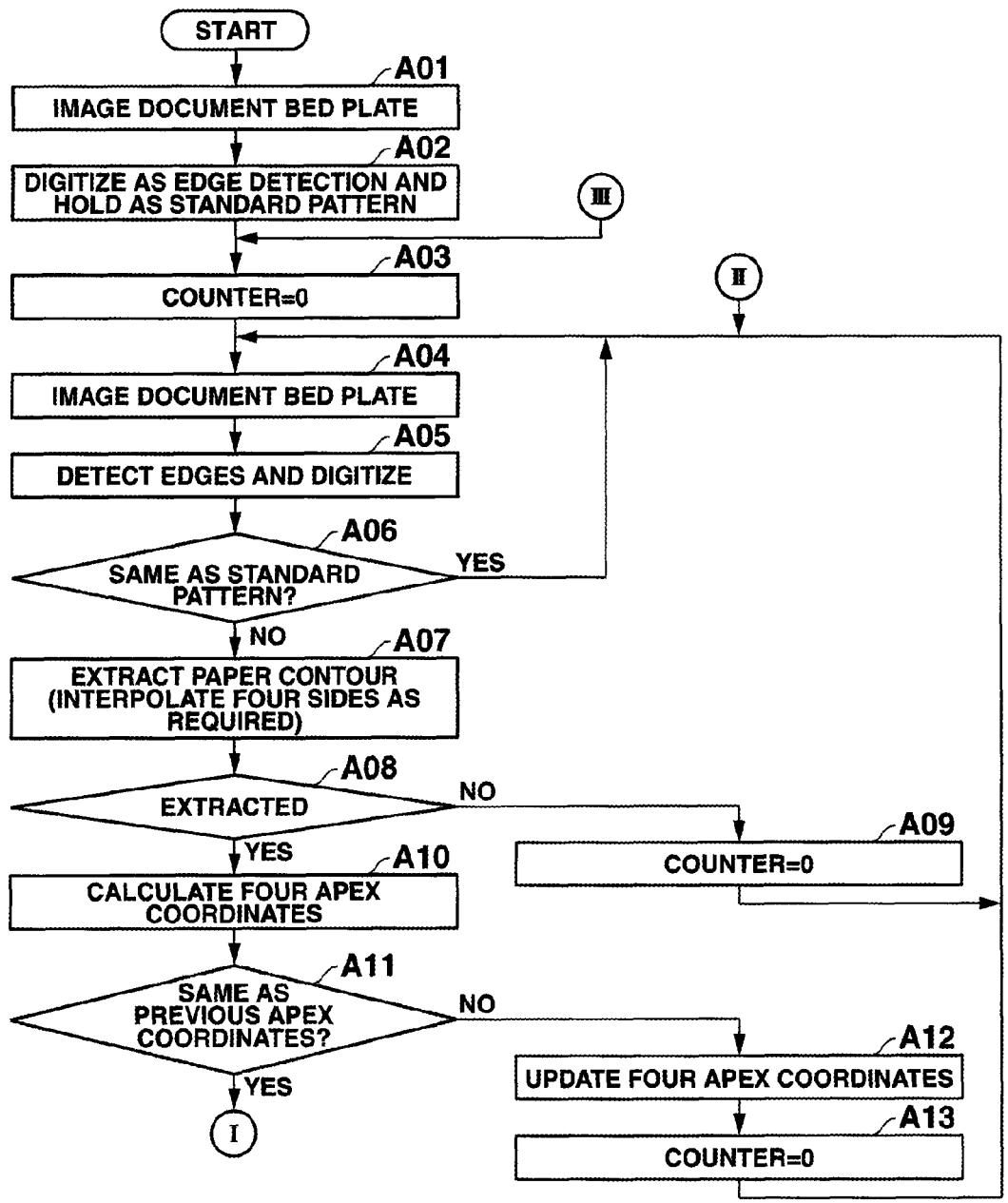
FIGS. 5 and 6 are flowcharts showing processing contents with respect to mounting an original document on a document bed plate according to the first embodiment.
Figure 6:
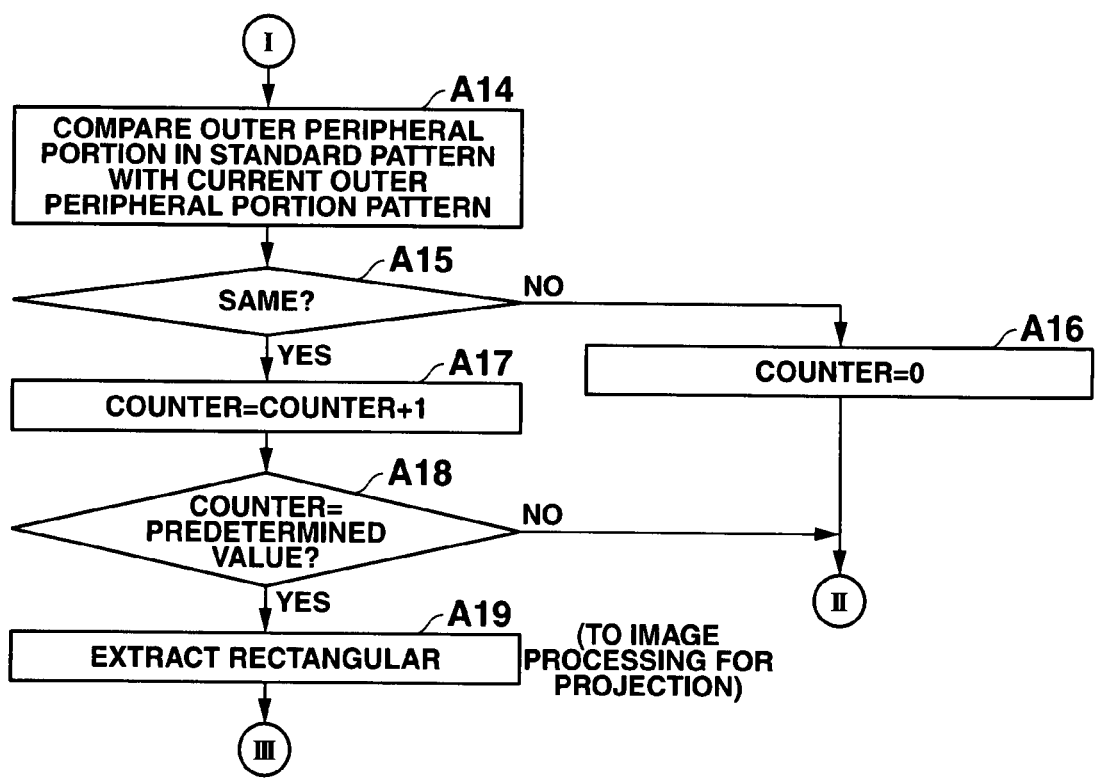

It is to be noted that, in the operation according to this embodiment, when the controller 66 reads a driver program for the document camera device 1 installed in the PC 2 from the hard disk drive 42 and develops and executes the read program in the main memory 33, the document camera device 1 set in a still display mode detects stillness of a document copy mounted on the document bed plate 1a under control by the PC 2. FIGS. 5 and 6 show contents based on the driver program.

At the beginning of the operation, the document camera device 1 images the document bed plate 1a having nothing mounted thereon (a step A01), and obtained image data is fetched from the document camera device 1 to detect edges. The obtained image data is subjected to black-and-white digitization in such a manner that an edge detected part alone becomes "black ("1")" and other parts becomes white ("0"), and the obtained data is held in a part of the main memory 33 as standard pattern data (a step A02).

Figure 7:
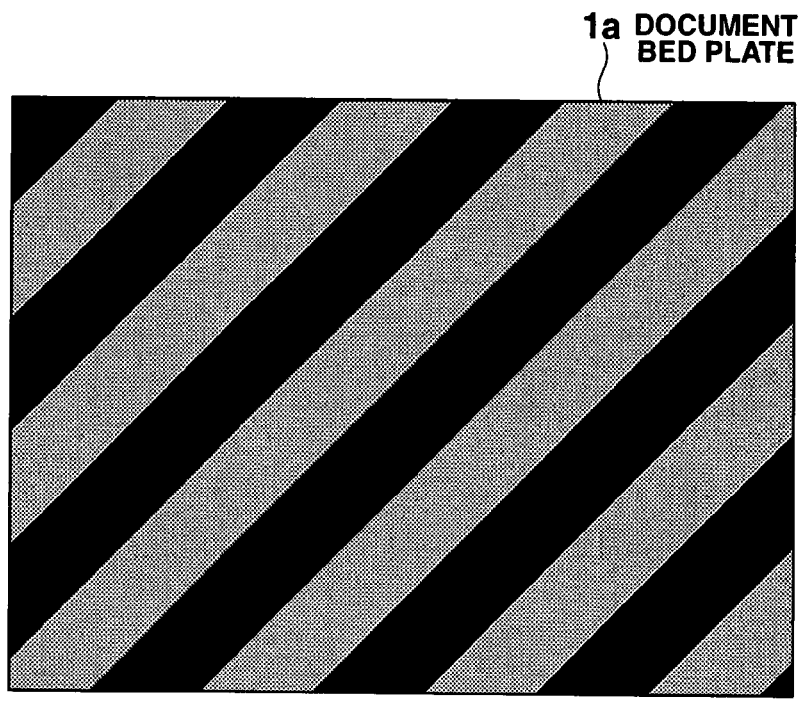
FIG. 7 is a view showing a captured image of the document bed plate alone according to the first embodiment.

FIG. 7 shows an example of an image of the document bed plate 1a captured at this time, and an oblique stripe pattern having two colors with greatly different luminance degrees is formed on the entire surface of the document bed plate 1a in advance as shown in this drawing.

Figure 8:
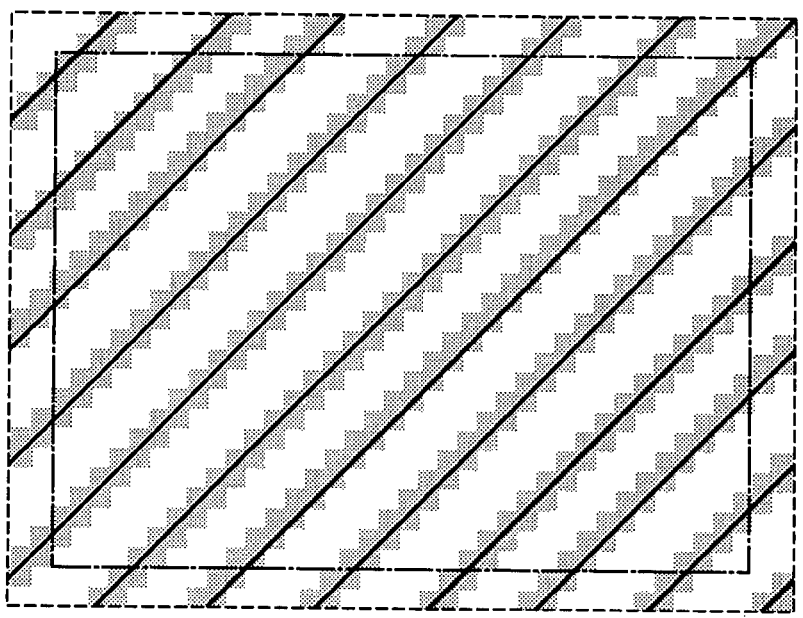
FIG. 8 is a view showing a digitized image obtained by detecting edges of the captured image depicted in FIG. 7 according to the first embodiment.

FIG. 8 shows an example of an image digitized after detecting edges of the pattern image of the document bed plate 1a depicted in FIG. 7, and depicts that contours of boundary parts of the stripe pattern and peripheries thereof are extracted by edge detection processing.

The image depicted in FIG. 8 is held as a standard pattern, and an outer image alone apart from a range indicated by an alternate long and short dash line is used as a standard pattern of an outer peripheral portion later.

Then, a counter that is used to judge stillness of an original document mounted on the document bed plate 1a is cleared to "zero" (a step A03).

Subsequently, the document bed plate 1a is again imaged (a step A04), and obtained image data is fetched from the document camera device 1 to detect edges. The obtained image data is subjected to black-and-white digitization in such a manner that an edge detected part becomes "black ("1")" and other parts become white ("0") (a step A05), and this digitized data is compared with the standard pattern data held at the step S02 to judge whether contents have been changed (a step A06).

If there is no change, it is determined that nothing is mounted on the document bed plate 1a, the control returns to the processing beginning from the step A04 and thereafter repeatedly executes the processing at the steps A04 to A06 to wait until an original document is mounted on the document bed plate 1a and a captured image is changed.

Then, when any original document is mounted on the document bed plate 1a and a captured image is changed, this situation is recognized at the step A06, and a contour of the subsequently mounted original document is extracted (a step A07).

Figure 9:
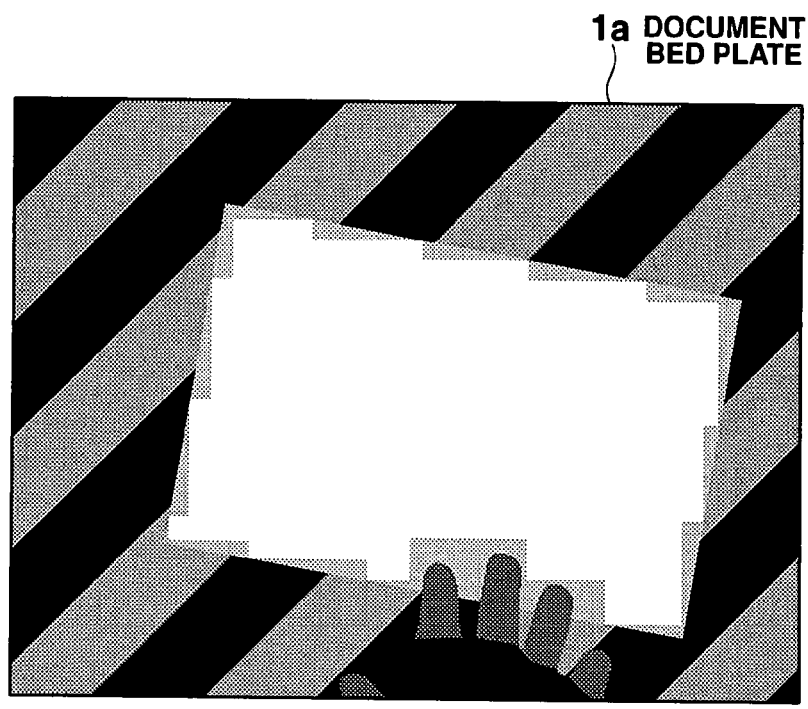
FIG. 9 is a view showing a captured image of the document bed plate having an original document mounted thereon according to the first embodiment.

FIG. 9 shows an example of a captured image when an original document is mounted on the document bed plate 1a, and depicts a state where a user's hand is also imaged together with the original document.

Figure 10:
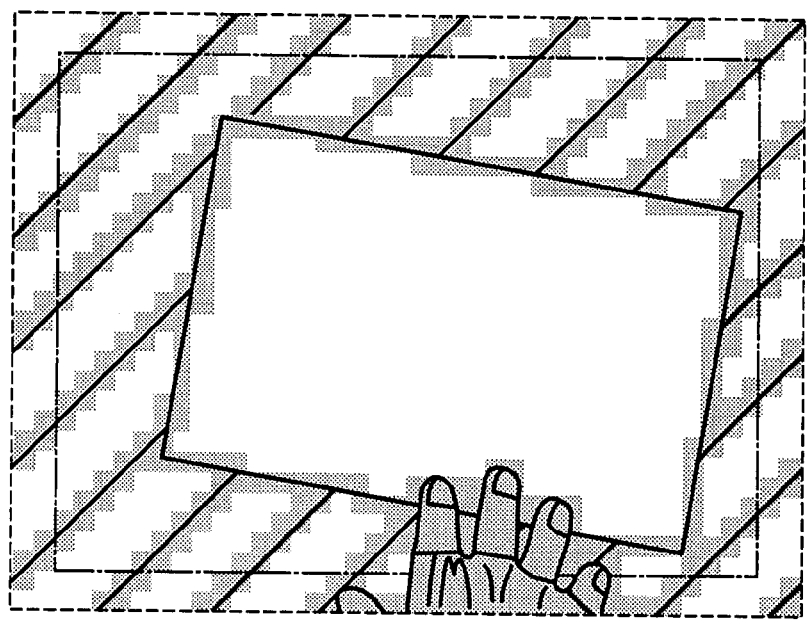
FIG. 10 is a view showing a digitized image obtained by detecting edges of the captured image depicted in FIG. 9 according to the first embodiment.
Figure 11:
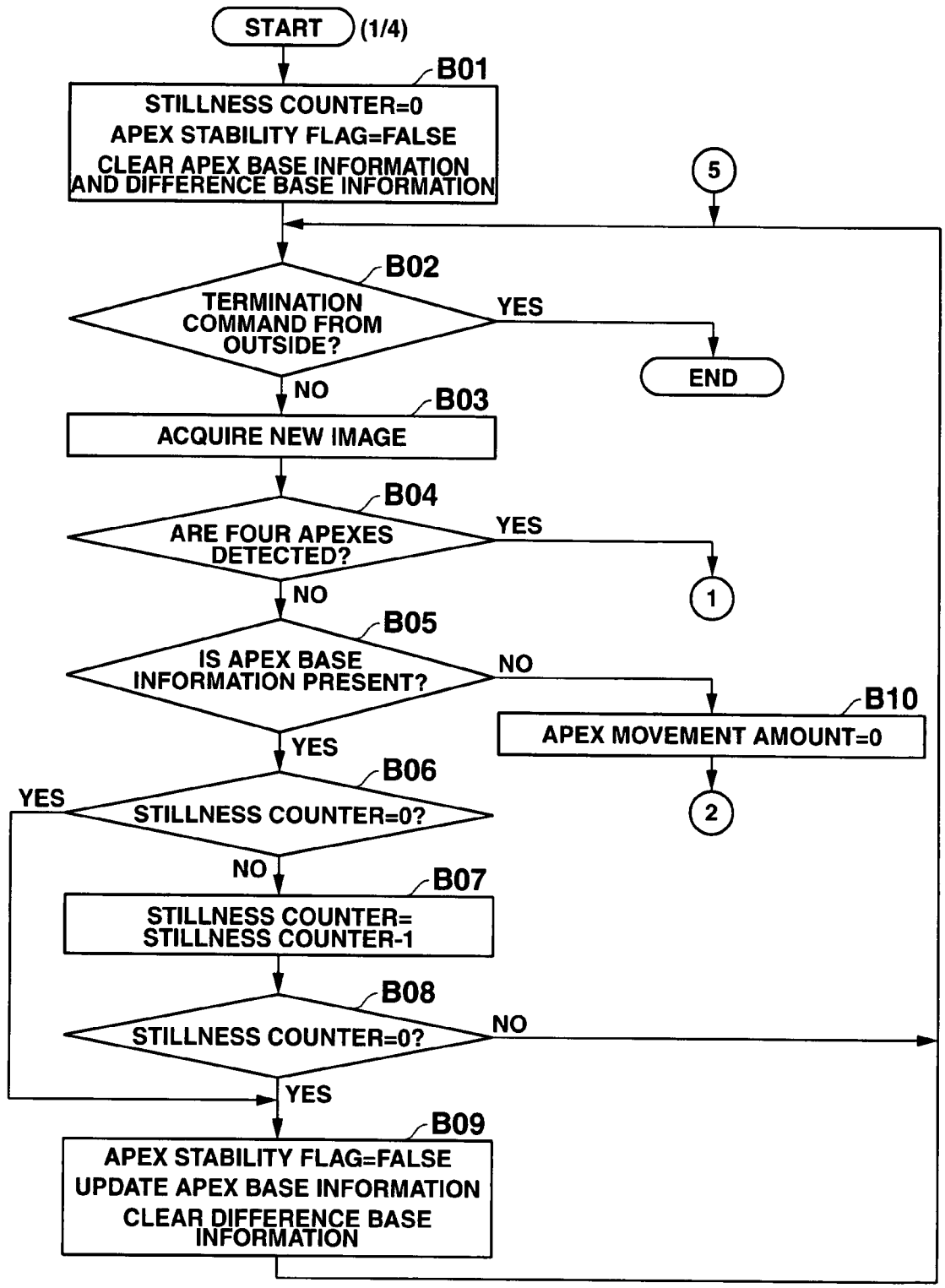
FIGS. 11, 12, 13, and 14 are flowcharts showing processing contents with respect to mounting an original document on a document bed plate according to a second embodiment of the present invention.
Figure 12:
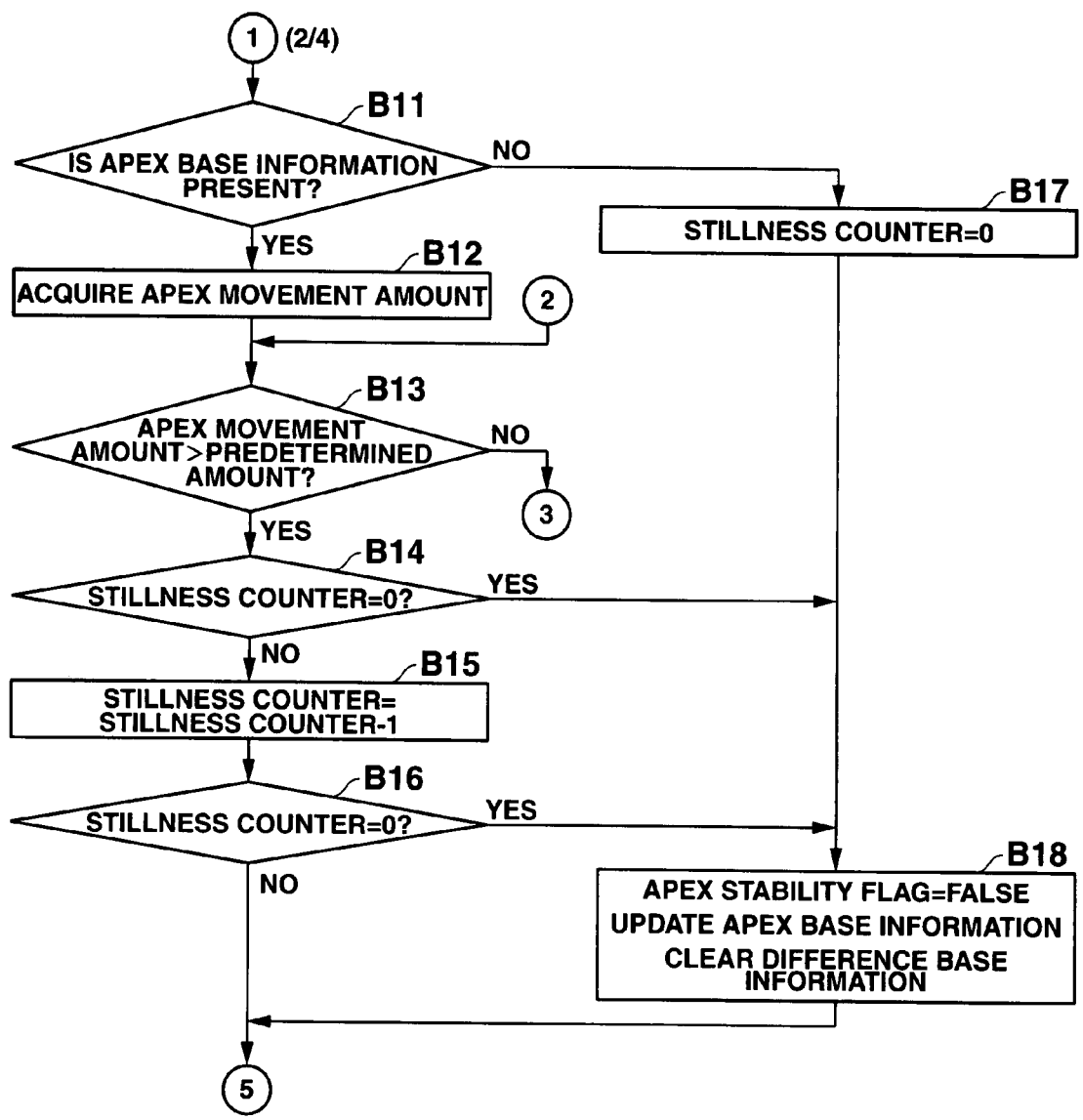
Figure 13:
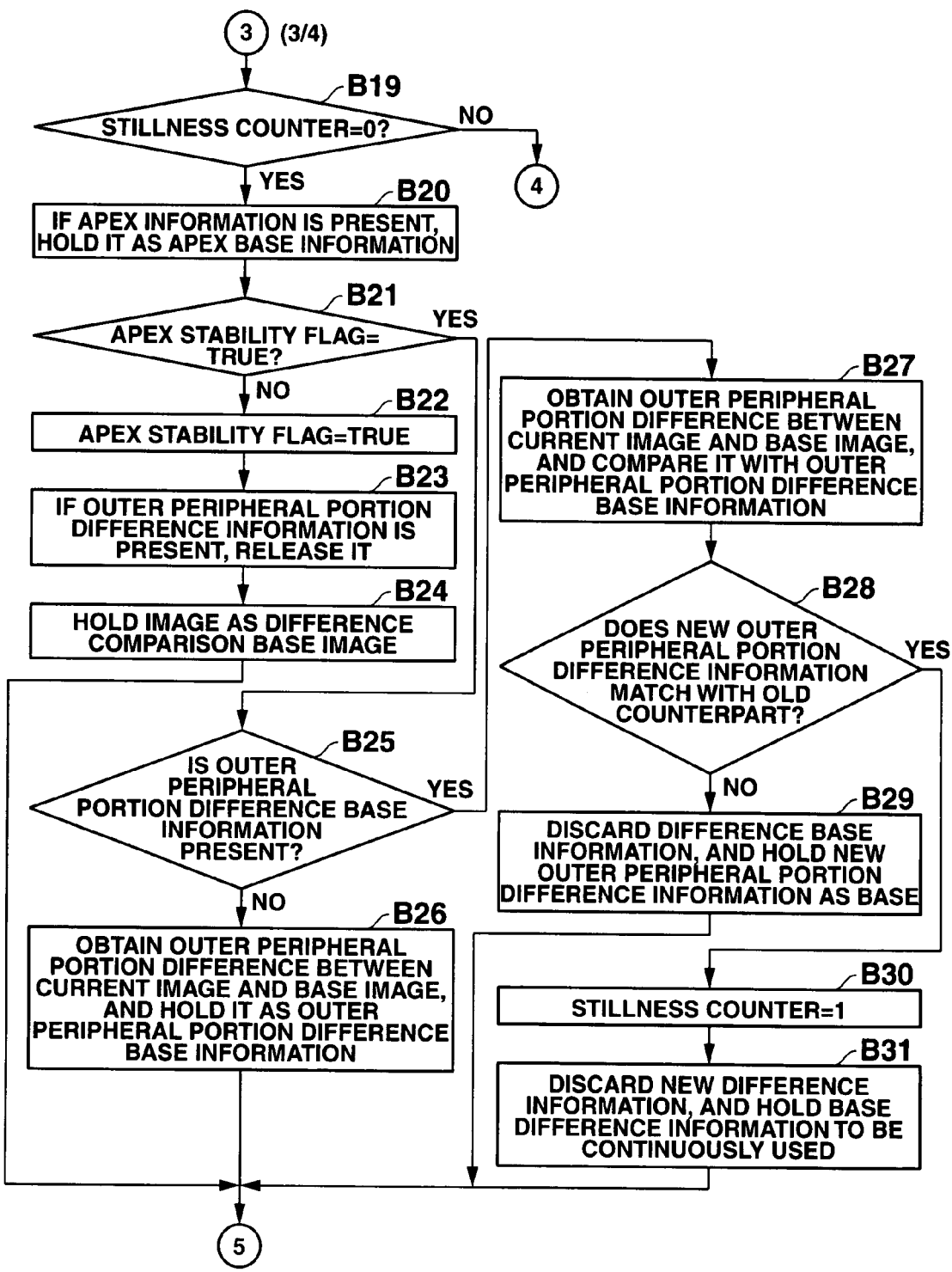
Figure 14:
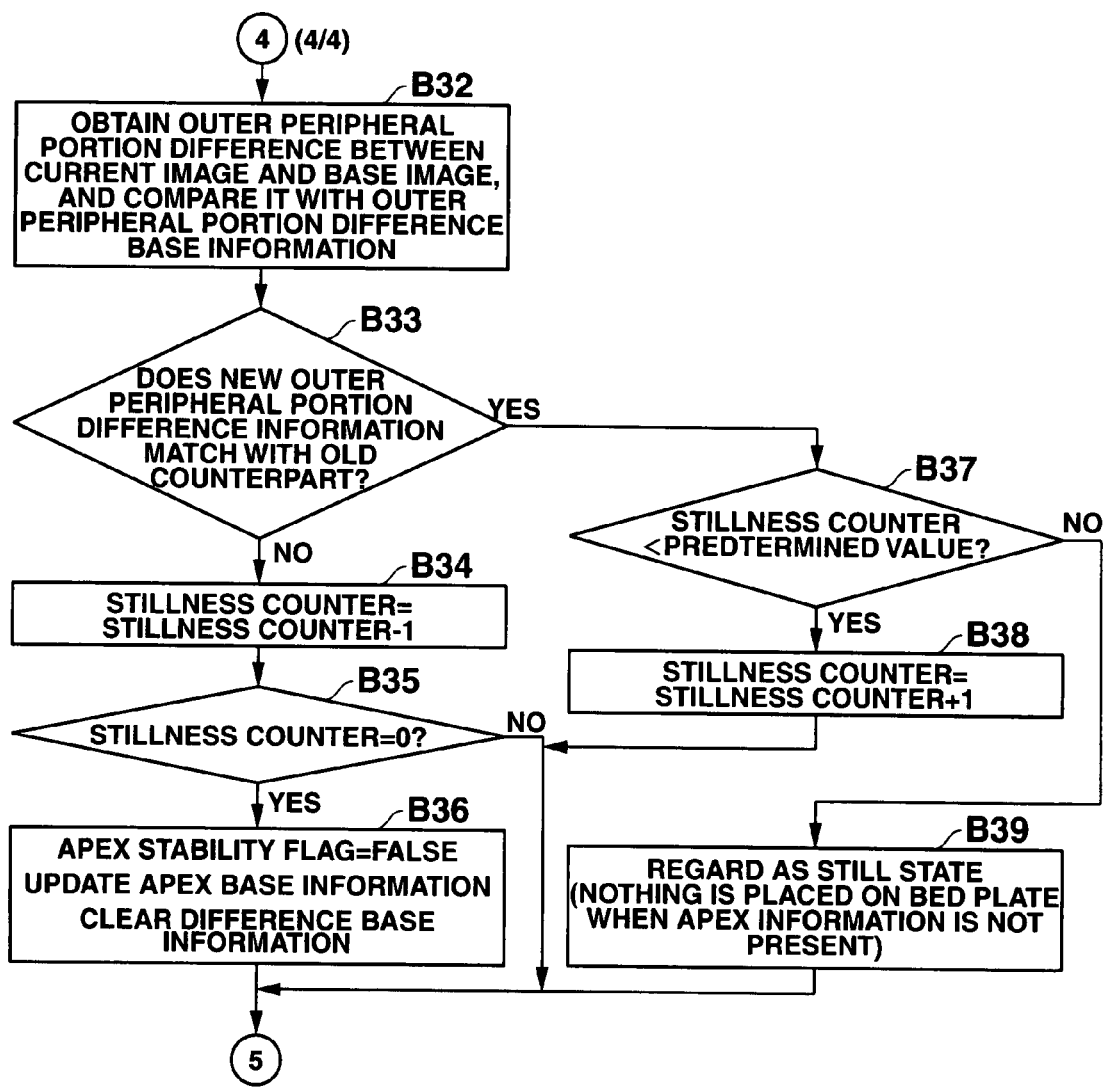

FIG. 10 shows a digitized image obtained by detecting edges of the captured image depicted in FIG. 9. In this drawing, of four sides of a contour of an original document, three sides are extracted as straight lines, but a remaining side becomes discontinuous by the user's hand.

When a discontinuity of a side is detected in this manner, interpolation processing is carried out as required to obtain four sides of an original document, and whether four sides of the original document have been extracted is consequently judged (a step A08).

Here, if it is determined that the four sides failed to be extracted, the counter is cleared to "zero" (a step A09), then the control returns to the processing starting from the step A04, and the same processing is repeated until the contour of the four sides of the original document can be extracted.

On the other hand, when performing the interpolation processing as required enables extraction of the four sides of the original document from the captured image, this is recognized at the step A08. Then, coordinate positions of four apexes each of which is an intersection of two adjacent sides of the four sides of the original document are calculated (a step A10). If there are previously calculated four apex coordinates, these coordinate positions are compared with the current coordinate positions to judge whether they are the same apex coordinates (a step A11).

Here, if there is no data of the previous four apex coordinates, i.e., if a contour of the original document can be extracted for the first time, or if there are previous four apex coordinates but they are different from the current contents, i.e., if the original document does not stand still on the document bed plate 1a, it is determined that the current apex coordinates are different from the previous coordinates. Update setting is carried out by using the currently obtained four apex coordinates (a step A12), the counter is cleared to "zero" (a step A13), and the control returns to the processing starting from the step A04 to repeat the same processing from a state where the contour of four sides of the original document can be newly extracted.

Further, if it is determined that the current four apex coordinates match with the previous coordinates at the step A11, this means that the original document has not moved on the document bed plate 1a from the previous imaging time, and hence an outer peripheral portion of the held standard pattern is compared with an outer peripheral portion of the currently obtained digitized image (a step A14) to judge whether contents of these portions are the same (a step A15).

Here, if it is determined that two pattern images of the outer peripheral portion are not the same, it can be considered that the original document has not be completely mounted on the document bed plate 1a yet as typified by the state where the user's hand is captured in the image shown in FIG. 10, the counter is cleared to "zero" (a step A16), and then the control returns to the processing from the step A04 to repeat the same processing from a state where the contour of four sides of the original document can be newly extracted.

Furthermore, if it is determined that the two pattern images of the outer peripheral portion are the same at the step A15, it can be considered that the original document has been completely mounted on the document bed plate 1a without capturing the user's hand in the image as shown in FIG. 10, a value of the counter is incremented by "+1" to be updated and selected (a step A17), and then whether the updated/set count value is a predetermined value indicative of a preset time value (a step A18).

Here, if it is determined that the value of the counter has not reached the predetermined value yet, the control directly returns to the processing at the step A04 to repeat the processing from the state where the contour of four sides of the original document can be newly extracted.

Then, in a period where the original document is mounted on the document bed plate 1a, a user's hand moves away from the original document and a fixed time elapses, the processing at the steps A04 to A08, A10, A11, A14, A15, A17, and A18 is repeatedly executed, and a value of the counter is incremented by "+1" to be updated and set.

Moreover, when the value of the counter reaches the predetermined value, i.e., when the original document is mounted on the document bed plate 1a, a user's hand moves away from the original document and a fixed time elapses in a still state, this is recognized at the step A18, and a rectangular part indicative of a position of the original document in a captured image obtained at this point in time is extracted (a step A19). Data of the extracted image is subjected to image processing that is not shown in this example, i.e., processing set by the user among luminance unevenness correction, color correction, luminance correction, contour extraction, and others, and further subjected to processing at a rear stage to be projected. On the other hand, the control returns to the processing starting from the step A03 to continue this processing.

In this manner, a discontinuity of an outer peripheral portion and a change in an image are detected from the image of an original document on the document bed plate 1a having the predetermined pattern formed thereon to judge stillness of the original document. Therefore, relatively simple image processing enables correctly judging stillness of the original document on the document bed plate 1a.

In particular, in the foregoing embodiment, discontinuation of a change in a captured image of the document bed plate 1a is first confirmed, and then a state where a discontinuity of an outer peripheral portion is eliminated is counted until the predetermined value is reached to judge stillness, thereby further accurately judging stillness of the original document mounted on the document bed plate 1a.

In addition, a change in an image of the document bed plate 1a is specifically judged from movement of apex coordinates of the original document mounted on the document bed plate 1a, and movement of the apex coordinates of the original document is judged by detecting a contour of a document image in a captured image.

Therefore, extracting a contour of the original document mounted on the document bed plate 1a having such a predetermined stripe pattern as shown in FIG. 7 formed thereon readily enables interpolating a missed part (a discontinued part) of a side caused due to, e.g., imaging a user's hand even if such a part is present, thus rapidly and accurately executing the entire processing with flexibility.

Additionally, when detecting a discontinuity of an outer peripheral portion of a captured image, a pattern image of the outer peripheral portion of the document bed plate 1a in a state where nothing is mounted thereon is stored as a standard pattern in advance, and this standard pattern is compared with a state of the outer peripheral portion in a captured image obtained at this point in time. Therefore, simple image processing allows assuredly eliminating an influence of, e.g., imaging a user's hand and accurately judging stillness of the original document.

Second Embodiment

A second embodiment when the present invention is applied to a document projection system including a document camera device, a personal computer (PC), and a data projector will now be described hereinafter with reference to the accompanying drawings.

Figure 4:
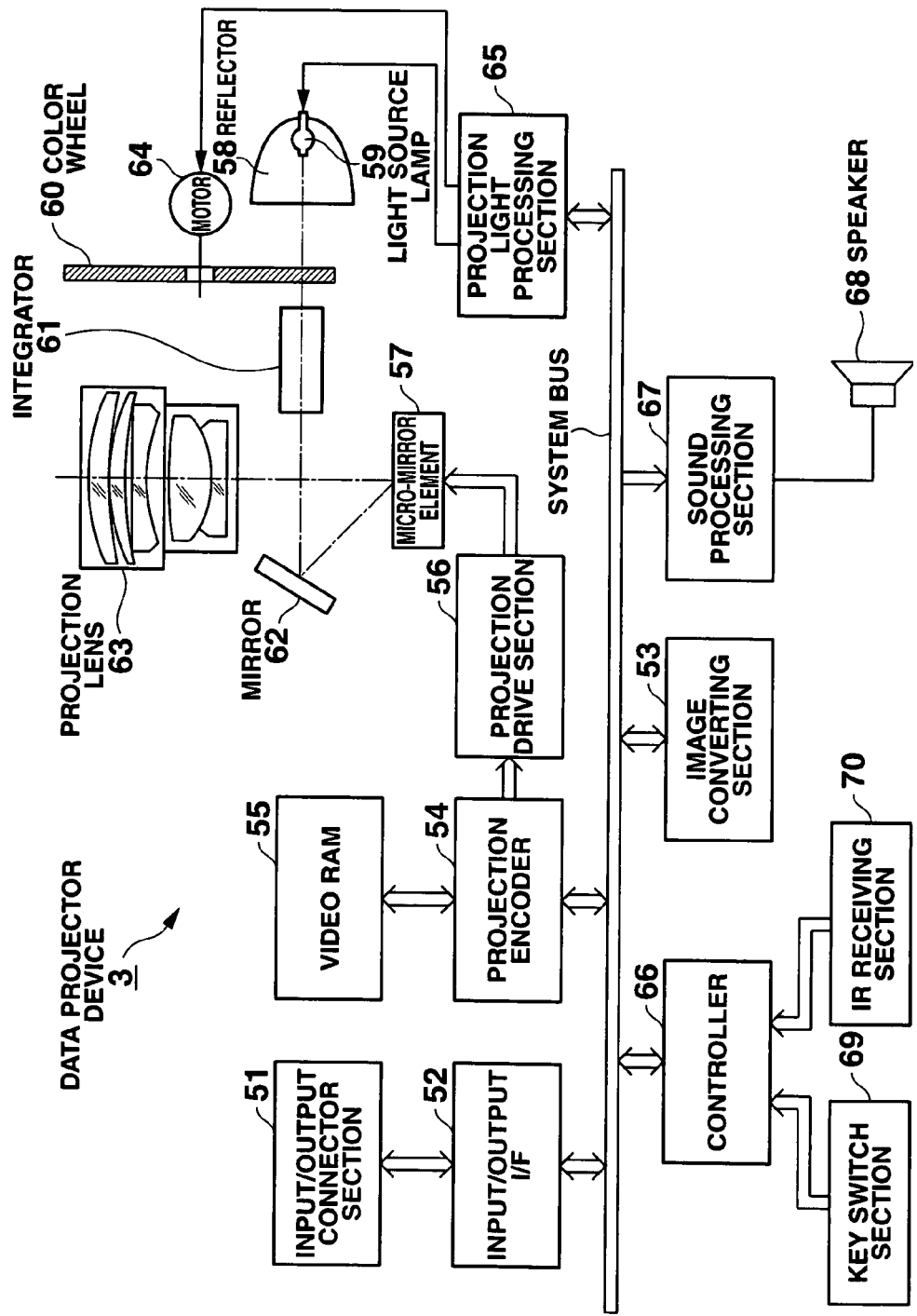
FIG. 4 is a block diagram showing a functional structure of an electronic circuit in a data projector device according to the first embodiment.

It is to be noted that an appearance and a connection structure of the entire system are the same as those depicted in FIG. 1, and functional structures of respective electronic circuits in the document camera device, the personal computer (PC), and the data projector device constituting the system are basically the same as those depicted in FIGS. 2 to 4. In the following explanation, like reference numerals denote the same parts, thereby omitting an illustration and an explanation thereof.

An operation of this embodiment will now be explained.

It is to be noted that, in the operation according to this embodiment, when a controller 66 reads a driver program for a document camera device 1 installed in a PC 2 from a hard disk drive 42 to be developed and executed in a main memory 33, the document camera device 1 set in a still display mode detects stillness of an original document mounted on a document bed plate 1a under control by the PC 2. FIGS. 11 to 14 show contents based on the driver program.

At the beginning of the operation, each variable is set to an initial value (a step B01).

Here, it is determined that a stillness counter (which will be referred to as a "stillness cnt" in the drawings) that counts a still time of an original document mounted on a document bed plate 1a, an apex stability flag indicating that each apex position of the original document mounted on the document bed plate 1a is stabled ("TRUE") or not ("FALSE"), apex base information indicative of each apex coordinate of a last position serving as a reference of the original document on the document bed plate 1a, and difference base information serving as a reference of a difference in mage information amount corresponding to presence/absence of the original document at an outer peripheral portion of the document bed plate 1a are set as variables. Specifically, an initial value "0" is set in the stillness counter, "FALSE" is set in the apex stability flag, and the apex base information and the difference base information are cleared.

Then, an external device of one of the document camera device 1 and the data projector device 3 other than the PC 2 is operated to confirm that there is no command that terminates detection of stillness of an original document (a step B02). Then, a new image on the document bed plate 1a is captured to acquire image data (a step B03). If there is a discontinuous position in a stripe pattern formed on the document bed plate 1a in the captured image, the discontinuous part is corrected to extract a contour of the original document mounted on the document bed plate 1a, and whether four apex coordinates of the original document have been detected is judged (a step B04).

At the beginning of the operation, since an original document is not mounted on the document bed plate 1a and four apex coordinates cannot be of courses detected. This state is recognized to judge whether the apex base information is present (a step B05).

Here, if the apex base information is not present, "0" is set as a movement amount of each apex (a step B10), and whether the apex movement amount is larger than a predetermined amount as a threshold value prepared for a stillness judgment in advance (a step B13).

Here, the apex movement amount is of course "0" by the above-described setting and smaller than the predetermined amount. This state is recognized and then whether a value of the stillness counter is "0" is judged (a step B19).

In a case where the value of the stillness counter is "0", if information of the last apex coordinates is present, this information is held and set as the apex base information. If information of the last apex coordinates is not present, nothing is carried out (a step B20) and then whether the apex stability flag indicates "TRUE" is judged (a step B21).

Here, since the apex stability flag indicates "FALSE" rather than "TRUE", this state is recognized to newly set "TRUE" to the apex stability flag (a step B22). If difference information of the outer peripheral portion is present, this information is released (discarded) (a step B23), then image data acquired by imaging is held in a main memory 33 as a base image for difference comparison (a step B24), and then the control returns to the processing at the step B02 to execute the next imaging.

In this manner, the processing at the steps B02 to B04, B10, B13, and B19 to B24 is repeatedly executed until the original document is mounted on the document bed plate 1a.

Figure 15:
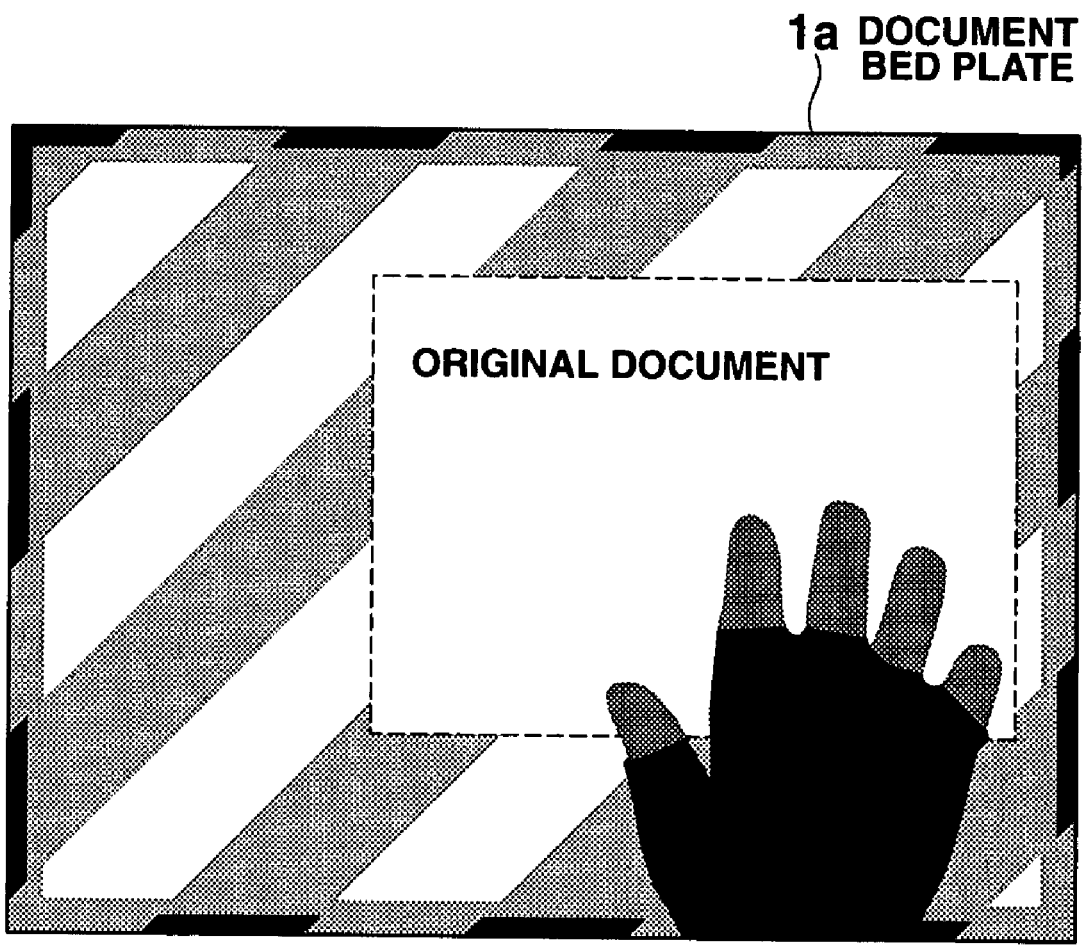
FIG. 15 is a view showing a captured image of the document bed plate having an original document mounted thereon according to the second embodiment.

FIG. 15 shows an example of an image captured in a state where an original document is mounted on the document bed plate 1a, and it can be understood that a user's hand is imaged together with the original document.

In a state where the original document is to be mounted on the document bed plate 1a in this manner, three of four sides constituting the original document in the captured image can be immediately extracted from a contour of the image. However, a remaining side (a lower side in the drawing) on which a hand is put is calculated based on interpolation processing, thereby detecting four apex coordinates.

When an image is captured at the step B03 while the original document is to be mounted on the document bed plate 1a and the four apex coordinates are detected based on contour extraction, this state is recognized at the subsequent step B04 to judge whether apex base information is present (a step B11).

Since the apex base information is not present at this initial stage, when this state is recognized, then "0" is set to the still counter (a step B17), "FALSE" is set to the apex stability flag, the apex base information is updated and set with the detected contents, difference base information is cleared (a step B18), and then the control returns to the processing beginning from the step B02.

When a new image is acquired by capturing at the step B03 through the B02 and it is determined that the apex base information is present at the step B11 through the step 04, coordinate positions in the apex base information is subtracted from respective corresponding positions of the currently acquired four apex coordinates, and a sum total of the obtained differences is obtained to calculate an apex movement amount (a step B12).

This acquired apex movement amount is compared with a predetermined amount as a previously prepared threshold value to judge whether this amount is larger than the predetermined amount (a step B13).

Here, if it is determined that the apex movement amount is larger than the predetermined amount, it can be considered that the original document on the document bed plate 1a is moving, and whether a value of the stillness counter is "0" is judged (a step B14).

If the value of the stillness counter is "0", "FALSE" is newly set to the apex stability flag, the last four apex coordinates detected at the step B04 are updated and set as the apex base information, the difference base information is cleared (a step B18), and then the control returns to the processing at the step B02.

When the original document is present on the document bed plate 1a and its movement amount is large in this manner, the processing at the steps B02 to B04, B11 to B14, and B18 is repeatedly executed.

Thereafter, when the original document is present on the document bed plate 1a and its movement amount is reduced, it is determined that the apex movement amount is not greater than the predetermined amount at the step B13 after the processing at the steps B02 to B04, B11, and B12 like the above, and then whether the value of the stillness counter is "0" is judged (a step B19).

When the value of the stillness counter is "0", the apex base information is updated and held as required (a step B20), and then whether the apex stability flag indicates "TRUE" is judged (a step B21).

If the apex stability flag indicates "FALSE" rather than "TRUE", this state is recognized, and "TRUE" is newly set to the apex stability flag (a step B22). If difference information of an outer peripheral portion is present, this information is released (discarded) (a step B23), then image data acquired by imaging is held in the main memory 33 as a base image for difference comparison (a step B24), and thereafter the control returns to the processing at the step B02 to perform the next imaging.

Subsequently, in a state where a position of the original document on the document bed plate 1a stands still and, on the other hand, a user's hand alone slightly moves, when it is determined that the apex stability flag indicates "TRUE" at the step B21 after the processing at the steps B02 to B04, B11 to B13, B19, and B20 like the above, whether difference base information of the outer peripheral portion is present is judged (a step B25).

Here, since the difference base information of the outer peripheral portion is still in a cleared state and hence it is not present, this state is recognized, and an outer peripheral portion difference between the last image acquired by imaging at the step B03 and the last base image held at the step B24 is newly calculated.

Here, in regard to the outer peripheral portion difference, for example, the outer peripheral portion alone in the image is divided into blocks constituted of, e.g., eight pixels×eight pixels, differences (absolute values) at the same pixel position between the blocks placed at the same position in the two images are acquired in accordance with each of an R (red) component, a G (green) component, and a B (blue) component, and an average value for each block is calculated.

It is to be noted that the average value is obtained for each block in order to soften an influence when noise or the like occurs in one of the plurality of pixels and prevent the difference information from coming under this influence.

The thus obtained difference information is held and set as the difference base information (a step B26), and then the control returns to the processing at the step B02 to perform the next imaging.

Thereafter, when it is determined that the difference base information of the outer peripheral portion is present at a step B25 after the same processing steps, i.e., the processing at the steps B02 to B04, B11 to B13, and B19 to B21, an outer peripheral portion difference between the last image obtained by imaging at the step B03 and the last base image held at the step B24 is calculated, and this outer peripheral portion difference is compared with the difference base information of the outer peripheral portion held at the step B26 to judge whether the new outer peripheral portion difference information matches with the old counterpart (a step B28).

In this case, in regard to comparison of the difference information, for example, R components are first compared with each other in the above-described divided block unit to judge whether a difference that is not smaller than a predetermined value is present. If the difference that is not smaller than the predetermined value is present, this block is regarded as a changed block. On the other hand, when a difference that is less than the predetermined value is present, it is determined that no change occurs. Subsequently, the same comparison is performed with respect to the G components. If there is still no change, the same comparison is carried out with respect to B components. If there is a difference that is less than the predetermined value in all of the RGB components, this block is regarded as a block having no change.

Here, when both the components do not match with each other, i.e., in a state where a user's hand fluctuates at the outer peripheral portion, this state is recognized to discard the (old) difference base information, and the new difference information is held as the difference base information (a step B29). Then, the control returns to the processing at the step B02 to perform the next imaging.

When the original document stands still on the document bed plate 1a and the user's hand keeps fluctuating, the processing at the steps B02 to 04, B11 to B13, B19 to B21, B25, and B27 to B29 is repeatedly executed, and the difference base information of the outer peripheral portion is kept being updated as required.

Then, when the original document on the document bed plate 1a and the user's hand temporarily stand still, the processing at the steps B02 to B04, B11 to B13, B19 to B21, B25, and B27 to B29 is executed like the above.

At the step B28 during this processing, since the base image is captured at the initial stage where the hand is moving, it is determined that the new difference information of the outer peripheral portion does not match with the old counterpart like the above, the difference base information is updated at the step B29, and then the control returns to the processing at the step B02.

Then, in a second processing step cycle after the user's hand stands still, since the state where the hand does not move continuously occurs twice, it is determined that the new difference information of the outer peripheral portion matches with the old counterpart at the step B28 after the processing at the steps B02 to B04, B11 to B13, B19 to B21, B25, and B27.

In this case, a numeral value "1" is set to the stillness counter (a step B30), then the new difference information is discarded to avoid redundancy, the old difference base information is held to be continuously used as it is (a step B31), and the control returns to the processing at the step B02.

Thereafter, in a third processing step cycle after the user's hand temporarily stands still on the document bed plate 1a, when it is determined that the value in the stillness counter is not "0" at the step B19 after the processing at the steps B02 to B04 and B11 to B13, an outer peripheral portion difference between the last image obtained by imaging at the step B03 and the last base image held at the step B24 is calculated, and this calculated difference is compared with the difference base information of the outer peripheral portion held at the step B26 (a step B32) to judge whether the new outer peripheral portion difference information matches with the old counterpart (a step B33).

Here, if the new information matches with the old information, a judgment is made upon whether the value of the stillness counter is less than a predetermined value, e.g., "3" prepared to judge stillness of an image (a step B37). If this value is less than the predetermined value, the value of the stillness counter is incremented by "+1" to be updated and set to "2" (a step B38), and the control returns to the processing at the step B02.

Then, when the temporary still state of the user's hand on the document bed plate is finished and the hand moves away from the upper side of the document bed plate 1a, the new difference information is compared with the old difference information based on an image of the moving hand at this point in time at the step B32 after processing at the steps B02 to B04, B11 to B13, and B19 to judge whether the new difference information matches with the old difference information at the step B33.

In this case, since the new difference information does not match with the old difference information because of movement of the hand, this state is recognized, the stillness counter is decremented by "−1" to be updated and set (a step B34), it is confirmed that the updated and set count value is not the initial value "0" (a step B35), and the control returns to the processing at the step B02.

The processing at the steps B02 to B04, B11 to B13, B19, B32, B34, and B35 is repeatedly executed in this manner while the user's hand is moving on the document bed plate 1a.

Further, when the count value of the stillness counter becomes "0" by continuous decrement, this state is recognized at the step B35, "FALSE" is newly set to the apex stability flag, the apex base information is updated and set by using the last four apex coordinates detected at the step B04, the difference base information is cleared (a step B36), and the control returns to the processing at the step B02.

Then, when the user's hand completely moves away from the document bed plate 1a and an image of the document bed plate 1a and the original document mounted thereon alone is captured, "TRUE" is again set to the apex stability flag at the step B22 after the processing at the steps B02 to B04, B11 to B13, and B19 to B21 in the first processing cycle, and then the control returns to the processing beginning from the step B02 after the processing at the steps B23 and B24.

In a second processing cycle, when it is determined that the apex stability flag indicates "TRUE" at the step B21 after the processing at the steps B02 to B04, B11 to B13, B19, and B20 and then it is determined that the difference base information of the outer peripheral portion is not preset at the step B25, an outer peripheral portion difference between the last image obtained by imaging at the step B03 and the last base image held at the step B24 is newly calculated at the step B26, this difference is held and set as the difference base information, and the control returns to the processing beginning from the step B02.

Then, in a third processing cycle after the user's hand is completely apart from the upper side of the document bed plate 1a, when it is determined that the difference base information of the outer peripheral portion is present at the step B25 after the processing at the steps B02 to B04, B11 to B13, and B19 to B21, an outer peripheral portion difference between the last image obtained by imaging at the step B03 and the last base image held at the step B24 is calculated at the step B27, and the calculated outer peripheral portion difference is compared with the difference base information of the outer peripheral portion held at the step B26 to judge whether the new outer peripheral portion difference information matches with the old counterpart at the step B28.

At this point in time, nothing is placed on the outer peripheral portion in both the new difference information and the old difference information, and it is determined that the new difference information matches with the old difference information. A numeral value "1" is set to the stillness counter at the step B30, the new difference information is discarded to avoid redundancy at the step B31, the old difference information is held and set to be continuously used as it is, and the control returns to the processing beginning from the step B02.

Then, in a fourth and a fifth processing step cycles after the user's hand is completely apart from the upper side of the document bed plate 1a, the value in the stillness counter is continuously incremented by "+1" twice to be updated and set to "3" at the step B38 after the steps B02 to B04, B11 to B13, B19, B32, B33, and B37.

Thereafter, in a sixth processing step cycle after the user's hand is completely apart from the upper side of the document bed plate 1a, when it is determined that the value of the stillness counter is not less than the predetermined value at the step B37 after the steps B02 to B04, B11 to B13, B19, B32, and B33 like the above, it is recognized that the upper side of the document bed plate 1a is in a still state at this point in time. When the document camera device 1 is in the still display mode, predetermined processing is carried out. For example, the original document on the document bed plate 1a is imaged with a larger image size and a high gradation and subjected to various kinds of preset correction processing, e.g., color correction, luminance evenness correction, trapezoidal correction and others, thereby projecting and displaying an obtained image.

As described above, when a discontinuity of an outer peripheral portion and a change in an image of the original document are detected from the image of the original document on the document bed plate 1a having the predetermined pattern formed thereon, stillness of the original document is determined, thereby accurately determining stillness of the original document on the document bed plate 1a based on relatively easy image processing.

In particular, in the foregoing embodiment, a change of the original document in the document bed plate image is judged by connecting discontinuous positions on a contour of the pattern to acquire a contour of the original document and comparing a sum total of movement amounts of respective apex coordinates on this contour with a preset value, thus further accurately judging stillness of the original document mounted on the document bed plate 1a.

Furthermore, a time at which a change stops is determined based on the counting operation of the stillness counter by calculating difference information from the last image of the outer peripheral portion of the document bed plate 1a as required.

Therefore, although image processing is simple, an influence of, e.g., imaging a user's hand can be accurately eliminated, thus correctly judging stillness of the original document.

Third Embodiment

A third embodiment in which the present invention is applied to a document projection system including a document camera device, a personal computer (PC), and a data projector device will now be described hereinafter with reference to the accompanying drawings.

It is to be noted that an appearance and a connection structure of the entire system are basically the same as those depicted in FIG. 1, and functional structures of individual electronic circuits in the document camera device, the personal computer (PC), and the data projector device are basically the same as those depicted in FIGS. 2 and 4. In the following explanation, like reference numerals denote the same parts, thereby omitting a description and an illustration thereof.

An operation according to this embodiment will now be explained.

Figure 16:
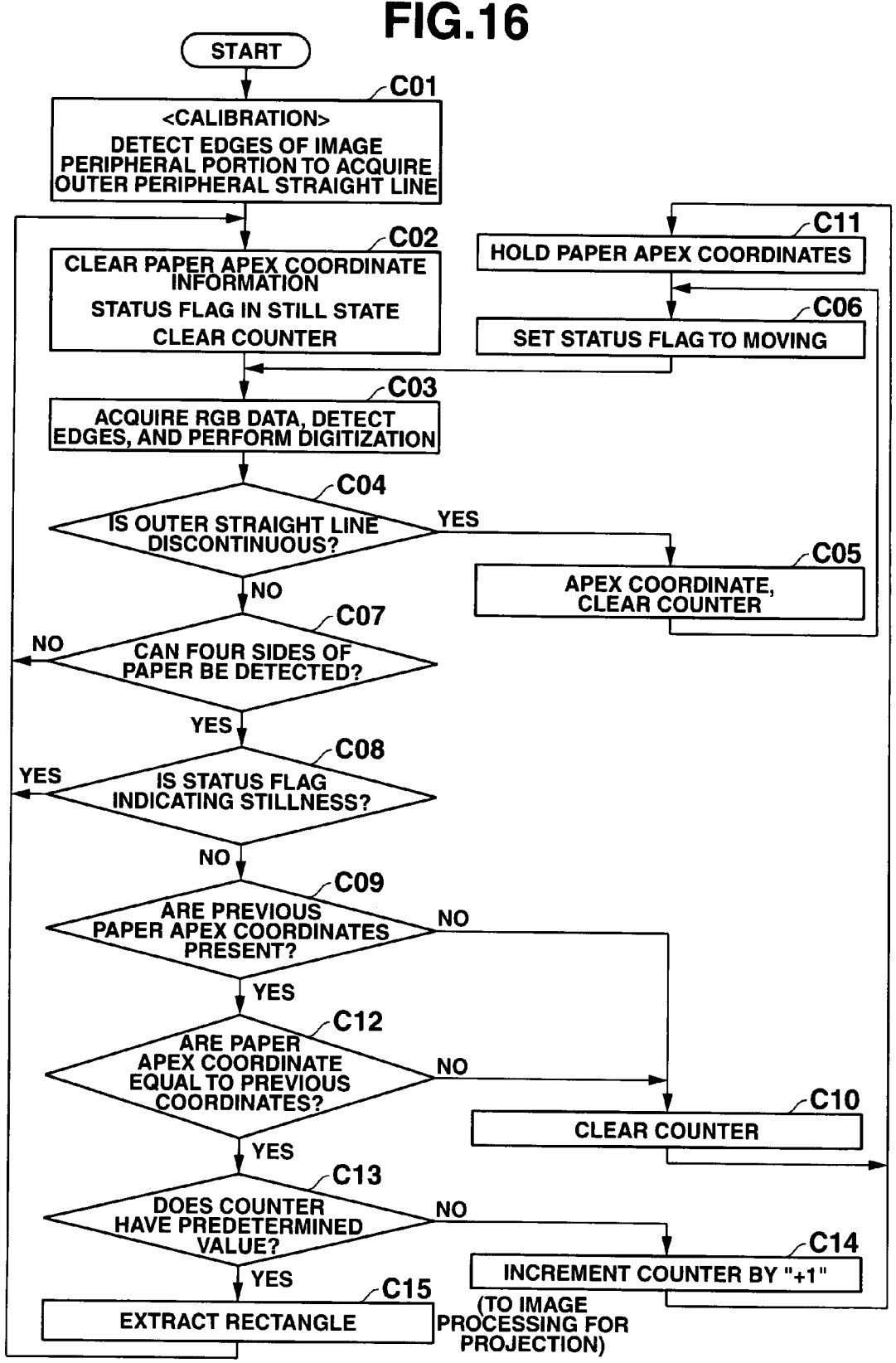
FIG. 16 is a flowchart showing processing contents with respect to mounting an original document on a document bed plate according to a third embodiment of the present invention.

It is to be noted that, in the operation according to this embodiment, when a controller 66 reads a driver program for a document camera device 1 installed in a PC 2 from a hard disk drive 42 to be developed and executed in a main memory 33, the document camera device 1 set in a still display mode detects stillness of an original document mounted on a document bed plate 1a under control by the PC 2. FIG. 16 shows contents based on the driver program.

At the beginning of the operation, as calibration on an initial stage of the operation, an image of the document bed plate 1a having no original document or the like mounted thereon is captured, and data of this image is fetched from the document camera device 1 to be subjected to edge detection. The image data is subjected to black-and-white digitization in such a manner that an edge detected part becomes "black ("1")" and other parts become white ("0"), and linear coordinates of an outer peripheral portion of the image are acquired and held in a part of the main memory 33 (a step C01).

Figure 17:
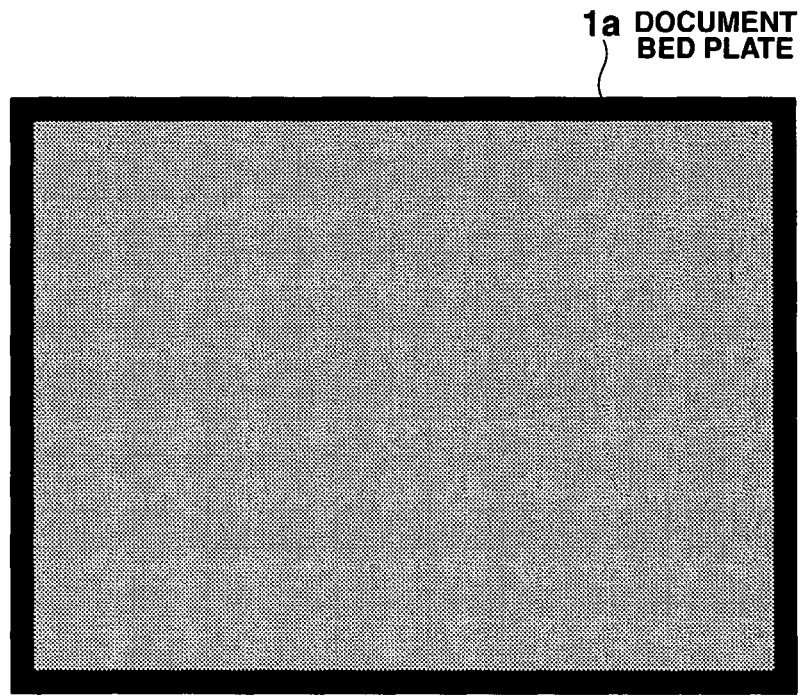
FIG. 17 is a view showing an example of a captured image of the document bed plate alone according to the third embodiment.

FIG. 17 shows an example of an image of the document bed plate 1a captured at this time. As shown in the drawing, an outer rim portion of the document bed plate 1a has such a trimming pattern, whose luminance and hue are greatly different from those on the inner side, formed thereto in advance.

Figure 18:
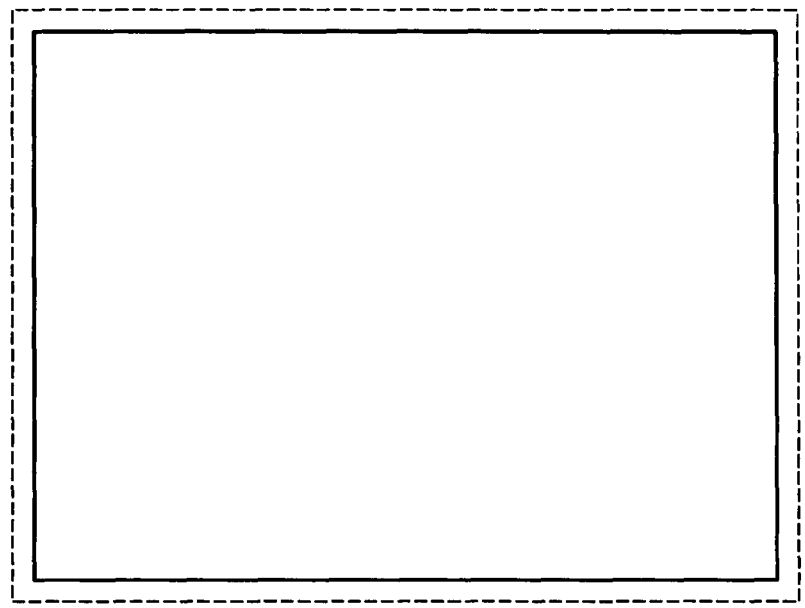
FIG. 18 is a view showing a digitized image obtained by detecting edges of the captured image depicted in FIG. 17 according to the third embodiment.

FIG. 18 shows an example of an image digitized after detecting edges of the pattern image of the document bed plate 1a depicted in FIG. 17, and illustrates a result of extracting a boundary part between the trimming pattern and the inner side as an outer peripheral straight line based on edge detection processing. This rectangular linear coordinate data is held in the main memory 33.

Subsequently, as initial setting, later-described coordinate information of paper sheet apexes of the original document mounted on the document bed plate 1a is cleared, a status flag is set to "still", and a count value of a counter is cleared (a step C02).

Here, the status flag is used to judge and set whether the original document mounted on the document bed plate 1a is in a "still" state or a "moving" state.

Moreover, the counter counts the still state of the original document, and it is determined that the original document on the document bed plate 1a stands still when the counter value reaches a predetermined value prepared in advance.

After the initial setting processing, an upper side of the document bed plate 1a is imaged in accordance with a predetermined frame rate, i.e., 15 frames/second to obtain image data, and edge detection of RGB data constituting this image data is performed. The image data is subjected to black-and-white digitization in such a manner that an edge detected part becomes "black ("1")" and other parts become white ("0") (a step C03), and the digitized data is compared with the linear coordinate data held at the step C01 to judge whether the outer peripheral straight line is discontinuous (a step C04).

Here, if it is determined that the outer peripheral straight line is not discontinuous, a judgment is made upon whether four sides of the original document can be detected (a step C07).

This judgment is made based on whether an image having a substantially rectangular shape other than the straight line of the outer peripheral portion is present in the digitized image obtained by the edge detection. If such an image is not present, the control returns to the processing starting from the step C02.

The control waits for the original document to be mounted on the document bed plate 1a while repeatedly executing the processing at the steps C02 to C04 and C07.

Then, when the original document is mounted on the document bed plate 1a and its image including a user's hand is captured, it is determined that the outer peripheral straight line becomes discontinuous at the step C04, both the apex coordinate information and the counter are cleared (a step C05), the status flag is changed and set to "moving" (a step C06), and the control returns to the processing starting from the step C03.

Figure 19:
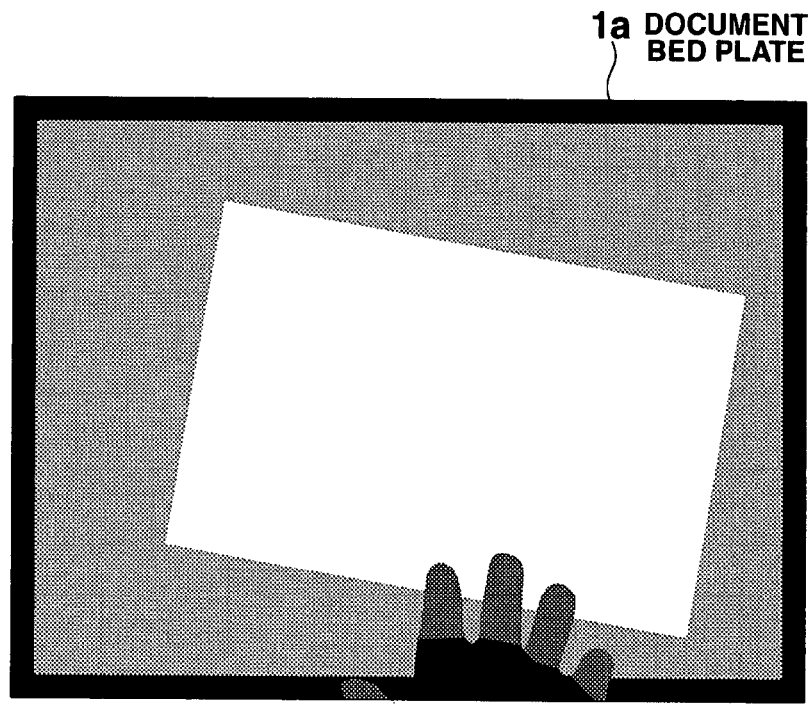
FIG. 19 is a view showing a captured image of the document bed plate having an original document mounted thereon according to the third embodiment.

FIG. 19 shows an example of a captured image during mounting the original document on the document bed plate 1a by a user's hand in this manner, and depicts a state where the user's hand is put on the outer peripheral portion of the document bed plate 1a.

Figure 20:
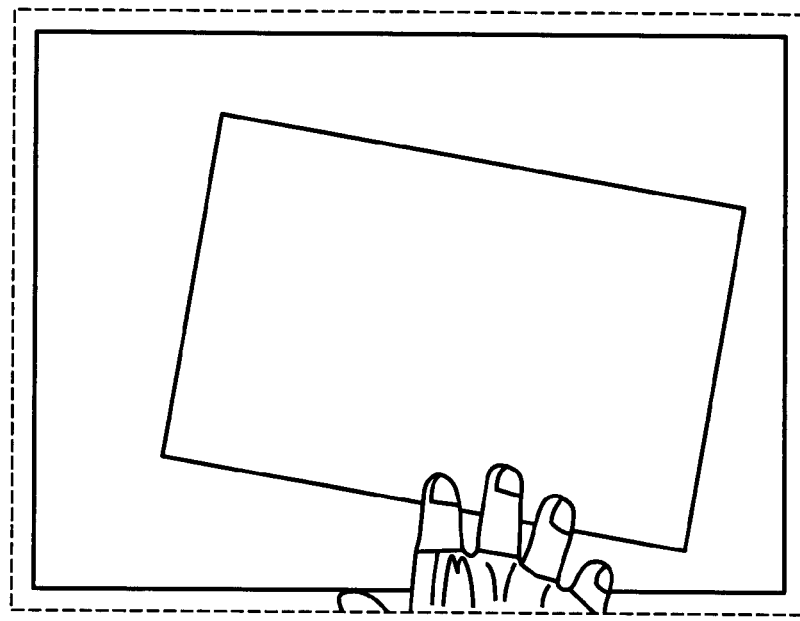
FIG. 20 is a view showing a digitized image obtained by detecting edges of the captured image depicted in FIG. 19 according to the third embodiment.

When this captured image is digitized by edge detection, such an image as depicted in FIG. 20 can be obtained, and it can be understood that the straight line of the outer peripheral portion becomes discontinuous due to the user's hand.

When the user's hand is placed on the document bed plate 1a, the user's hand necessarily cuts across a part of the outer peripheral portion of the document bed plate 1a so that the straight line of the outer peripheral portion becomes discontinuous. The processing at the steps C03 to C06 is repeatedly executed while this straight line is discontinuous.

Then, when the user's hand is away from the document bed plate 1a and the original document alone is mounted on the document bed plate 1a, it is recognized from the captured image that the straight line of the outer peripheral portion is not discontinuous at the step C04. Then, it is determined that four sides of a paper sheet of the original document can be detected at the step C07, and then whether the status flag indicates "still" is judged (a step C08).

Here, since the status flag is set to "moving" by the last processing at the step C06, it is determined that the status flag is not indicative of "still", and whether previous four-apex coordinate data of the paper sheet of the original document is held is judged (a step C09).

Here, if it is determined that the previous apex coordinate data is not held, the counter is cleared (a step C10), four-apex coordinate data of the paper sheet of the original document is newly held from the digitized image at this point in time (a step C11), the status flag is set to "moving" at the step C06, and the control returns to the processing starting from the step C03.

Thereafter, in a second processing cycle after the user's hand moves away from the document bed plate 1a, if it is determined that the previous four-apex coordinate data of the paper sheet of the original document is present at the step C09 after processing at the steps C03 to C04, C07, and C08, the previous four-apex coordinate data of the paper sheet of the original document held at the step C11 is compared with the current coordinate data obtained from the captured image to judge whether the previous data match with the current data, i.e., whether the document is moving on the document bed plate 1a (a step C12).

If it is determined that the previous four-apex coordinate data of the paper sheet of the original document is different from the current counterpart, the counter is cleared (a step C10), and the control returns to the processing starting from the step C11.

On the other hand, if it is determined that the previous coordinate data is equal to the current coordinate data, the original document is not moving on the document bed plate 1a, and hence it is confirmed that a count value of the counter that counts the still state has not reached a predetermined value (a step C13). Then, the count value of the counter is incremented by "+1" to be updated and set (a step C14), and the control returns to the processing starting from the step C11.

Then, in a state where the original document alone is mounted on the document bed plate 1a, the processing at the steps C11, C06, C03, C04, C07 to C09, and C12 to C14 is repeatedly executed, and the value of the counter is kept being incremented by "+1".

Additionally, when the value of the counter reaches the predetermined value, i.e., when the original document is mounted on the document bed plate 1a, the user's hand moves away from the original document to stand still and a fixed time elapses in this state, this state is recognized at the step C13, and a rectangular part defined by the four-apex coordinate data of the paper sheet of the original document mounted on the document bed plate 1a obtained by imaging is extracted (a step C15). The extracted image data is subjected to non-illustrated image processing, i.e., processing set by the user among luminance unevenness correction, color correction, luminance correction, contour extraction, and others, and further subjected to processing on a rear stage so that the image data is projected. On the other hand, the control returns to the processing at the step C02 to continue this processing.

Since detecting a discontinuous position of the outer peripheral portion and a change in an image are detected from an image of the original document on the document bed plate 1a having a simple pattern formed at the outer peripheral portion thereof enables a judgment on stillness of the original document in this manner, stillness of the original document on the document bed plate 1a can be accurately judged based on relatively simple image processing.

In particular, in the foregoing embodiment, a discontinuous position of the outer peripheral portion is first judged with respect to a captured image of the document bed plate 1a based on a discontinuous position of a contour of the patter.

Therefore, presence/absence of, e.g., a user's hand can be accurately judged based on simple image processing including edge detection and digitization.

Further, specifically, a change in an image of the document bed plate 1a is judged based on movement of apex coordinates obtained from a contour of the original document mounted on the document bed plate 1a, movement of the apex coordinates of the original document is judged based on comparison with the last apex coordinates, and a moveless state is subjected to predetermined-value counting. Therefore, interpolation processing and others do not have to be executed, and stillness of the original document can be very readily judged.

Figure 21:
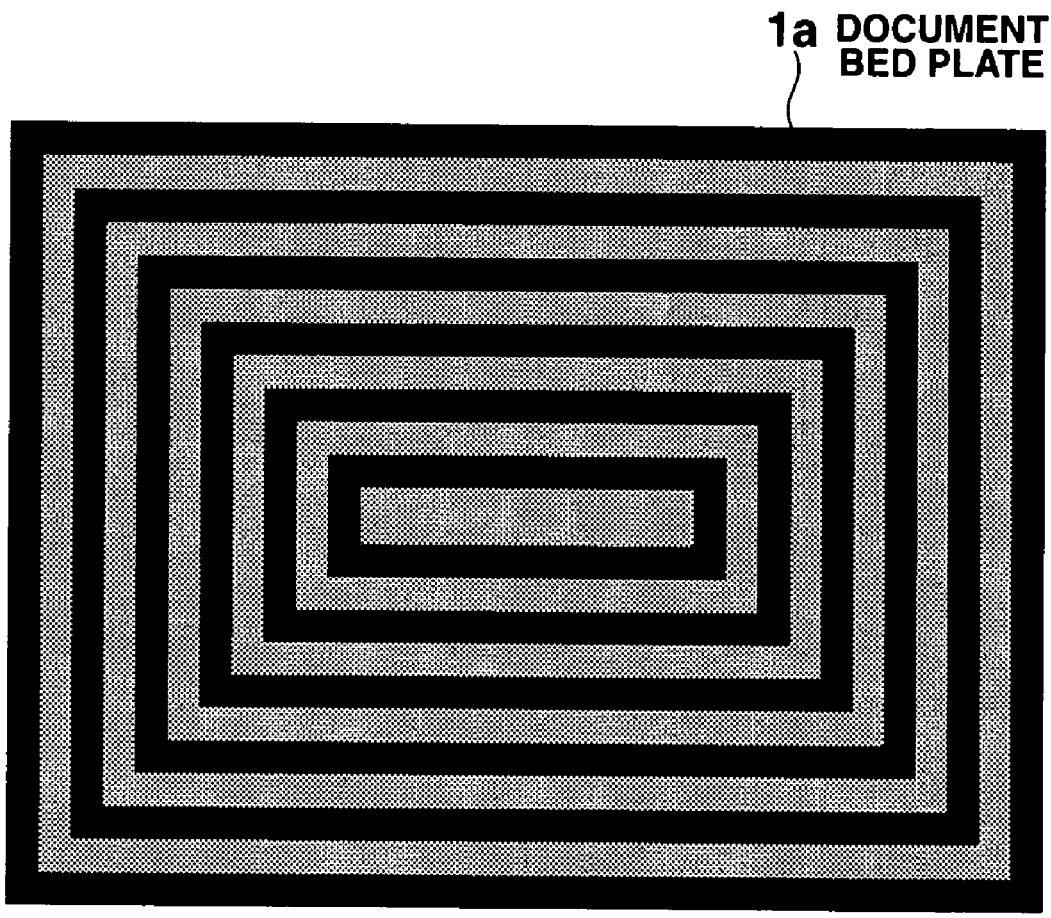
FIG. 21 is a view showing another pattern formed on the document bed plate according to the third embodiment.

Furthermore, the pattern formed on the upper surface of the document bed plate 1a is not restricted to that shown in FIG. 17. For example, when a lens optical system 12 of the document camera device 1 has a zoom function to vary an imaging range of the document bed plate 1a, a concentric rectangular pattern in which two colors that are greatly different in luminance and hue are alternately arranged with the same width may be formed on the upper surface of the document bed plate 1a as shown in FIG. 21.

Forming such a pattern on the upper surface of the document bed plate 1a enables coping with a zoom viewing angle of the lens optical system 12 and always assuredly judging four apex coordinates and four sides of an imaging of an original document mounted on the document bed plate 1a and a discontinuous position of the outer peripheral portion due to, e.g., a user's hand.

It is to be noted that the above has explained the example where the present invention is applied to the system in which the document camera device 1 is connected with the PC 2 and the data projector device 3 projects and displays an image captured by the document camera device 1 through the PC 2 in each of the first to the third embodiments. Although the above has described that the PC 2 executes each control operation based on the driver program for the document camera device 1 installed in advance, the present invention is not restricted thereto, and the document camera device 1 itself may execute the control operation therein.

The present invention is not restricted to the foregoing embodiments, and various modifications can be carried out without departing from the scope of the invention on an embodying stage. Moreover, the functions executed in the foregoing embodiments may be appropriately combined to be carried out to a maximum extent. The foregoing embodiments include various stages, and diverse inventions can be extracted by appropriately combining a plurality of disclosed constituent requirements. For example, if the effects can be obtained even though some constituent requirements are eliminated from all constituent requirements disclosed in the embodiments, a structure in which these constituent requirements are eliminated can be extracted as the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document imager comprising:
   a document bed plate on which an original document is mounted and which has a specific pattern formed on a surface thereof;
   an imaging section that images the original document mounted on the document bed plate;
   a first stillness judging section which judges stillness of the original document mounted on the document bed plate from at least one of (i) a discontinuity of the pattern of an outer peripheral portion in an image of the document bed plate obtained by the imaging section and (ii) a change in the outer peripheral portion in the image of the document bed plate;
   a second stillness judging section which judges the stillness of the original document mounted on the document bed plate by regarding movement of apex coordinates of the original document as a change in the image of the document bed plate; and
   an output section which outputs the image of the original document when both the first and second stillness judging sections judge that the original document is still.

2. The document imager according to claim 1, wherein the second stillness judging section judges the stillness after the first stillness judging section judges the stillness, and the output section outputs the image of the document bed plate after the second stillness judging section judges the stillness.

3. The document imager according to claim 1, wherein the first stillness judging section judges the stillness after the second stillness judging section judges the stillness, and the output section outputs the image of the document bed plate after the first stillness judging section judges the stillness.

4. The document imager according to claim 1, further comprising:
   a storage section which stores an image obtained by imaging the document bed plate having no original document mounted thereon;
   wherein the first stillness judging section judges the stillness of the original document based on a comparison with an outer peripheral portion in the image of the document bed plate having no original document mounted thereon stored in the storage section.

5. The document imager according to claim 1, wherein the first stillness judging section judges the stillness of the original document based on a difference amount of the outer peripheral portion in images of the document bed plate over time.

6. The document imager according to claim 1, wherein the first stillness judging section judges the stillness of the original document based on a discontinuity of a contour of the pattern.

7. The document imager according to claim 1, wherein the second stillness judging section judges the stillness of the original document based on a detected position of a contour of the original document on the pattern.

8. The document imager according to claim 1, wherein the second stillness judging section judges the stillness of the original document by recovering a discontinuous position on a contour of the pattern to acquire a contour of the original document, and comparing an absolute value of a sum total of movement amounts of respective apex coordinates on the contour of the original document with a preset value.

9. The document imager according to claim 1, further comprising a storage section that stores a result of detecting a contour of a captured image obtained by imaging the document bed plate with no original document mounted thereon;
   wherein the second stillness judging section judges the stillness of the original document by comparing the result of detecting the contour stored in the storage section with a result of detecting a contour of the image of the document bed plate obtained from the imaging section.

10. A document stillness detection method for a document imager that images an original document mounted on a document bed plate having a specific pattern formed on a surface thereof by an imaging section and outputs an image of the original document, the method comprising:
- a first judging comprising judging stillness of the original document mounted on the document bed plate from at least one of (i) a discontinuity of the pattern of an outer peripheral portion in an image of the document bed plate obtained by the imaging section, and (ii) a change in the outer peripheral portion in the image of the document bed plate;
- a second judging comprising judging the stillness of the original document mounted on the document bed plate by regarding movement of apex coordinates of the original document as a change in the image of the document bed plate; and
- outputting the image of the original document the original document is judged to be still by both the first judging and the second judging.

11. A non-transitory computer readable medium having a program stored thereon that is executable by a computer included in or connected with a document imager which uses an imaging section to image an original document mounted on a document bed plate having the original document mounted thereon and a specific pattern formed on a surface thereof and outputs an image of the original document, wherein the program is executable by the computer to perform functions comprising:
- a first judging comprising judging stillness of the original document mounted on the document bed plate from at least one of (i) a discontinuity of the pattern of an outer peripheral portion in an image of the document bed plate obtained by the imaging section, and (ii) a change in the other peripheral portion in the image of the document bed plate;
- a second judging comprising judging the stillness of the original document mounted on the document bed plate by regarding movement of apex coordinates of the original document as a change in the image of the document bed plate; and
- outputting the image of the original document the original document is judged to be still by both the first judging and the second judging.

* * * * *